(12) United States Patent
Hill et al.

(10) Patent No.: US 8,059,932 B2
(45) Date of Patent: Nov. 15, 2011

(54) MODULAR OPTICAL FIBER CASSETTE

(75) Inventors: John Paul Hill, Richfield, MN (US); Todd Frederick Husom, Crystal, MN (US); Walter Ernest Power, II, Golden Valley, MN (US)

(73) Assignee: Clearfield, Inc., Plymouth, MN (US)

( * ) Notice: Subject to any disclaimer, the term of this patent is extended or adjusted under 35 U.S.C. 154(b) by 0 days.

(21) Appl. No.: 12/552,140

(22) Filed: Sep. 1, 2009

(65) Prior Publication Data

US 2009/0324189 A1 Dec. 31, 2009

Related U.S. Application Data

(63) Continuation-in-part of application No. 12/286,554, filed on Sep. 30, 2008, now Pat. No. 7,751,674.

(51) Int. Cl.
*G02B 6/00* (2006.01)
(52) U.S. Cl. ........................................................ 385/135
(58) Field of Classification Search ................... 385/135
See application file for complete search history.

(56) References Cited

U.S. PATENT DOCUMENTS

| | | | |
|---|---|---|---|
| 4,630,886 A | 12/1986 | Lauriello et al. | |
| 4,708,430 A | 11/1987 | Donaldson et al. | |
| 4,840,449 A | 6/1989 | Ghandeharizadeh | |
| 5,129,030 A | 7/1992 | Petrunia | |
| 5,778,130 A | 7/1998 | Walters et al. | |
| 6,768,860 B2 | 7/2004 | Liberty | |
| 6,804,447 B2 | 10/2004 | Smith et al. | |
| 6,909,833 B2 | 6/2005 | Henschel et al. | |
| 6,915,057 B2 | 7/2005 | Vincent et al. | |
| 6,915,059 B2 | 7/2005 | Daoud et al. | |
| 6,925,241 B2 * | 8/2005 | Bohle et al. ............. | 385/135 |
| 7,142,764 B2 | 11/2006 | Allen et al. | |
| 7,236,677 B2 | 6/2007 | Escoto et al. | |
| 7,260,301 B2 | 8/2007 | Barth et al. | |
| 7,266,280 B2 | 9/2007 | Swenson et al. | |
| 2003/0113086 A1* | 6/2003 | Jun et al. ............. | 385/135 |
| 2008/0285933 A1 | 11/2008 | Vogel et al. | |
| 2009/0097813 A1 | 4/2009 | Hill | |

OTHER PUBLICATIONS

"The Clearfield Cassette." www.clearfieldconnection.com/products/clearview-cassette. Accessed Sep. 1, 2009. 2pgs.
"Clearfield Design Philosophy." www.clearfieldconnection.com/products/design-philosphy. Accessed Sep. 1, 2009. 1 pg.
"Snap-Together Simplicity." www.clearfieldconnection.com/products/snap-together. Accessed Sep. 1, 2009. 1 pg. "Configuration Options" www.clearfieldconnection.com/products/configuration-options. Accessed Sep. 1, 2009. 2 pgs.
"Take a Bite Out of Broadband Networks" www.clearfieldconnection.com/creativearc/whitepapers/wp_Clearfield_bite_out.pdf. Accessed Sep. 1, 2009. 14 pgs.
"Introduction to the Clearview Cassette." www.clearfieldconnection.com/creativearc/literature/ClearviewCassette.pdf. Accessed Sep. 1, 2009. 2 pgs.

* cited by examiner

*Primary Examiner* — Jerry Rahll
(74) *Attorney, Agent, or Firm* — Brooks, Cameron & Huebsch, PLLC

(57) ABSTRACT

The present disclosure includes apparatus and methods for a modular optical fiber cassette. One embodiment includes a base housing configured to receive additional nested components and an adapter plate resiliently connected to the housing and comprising a plurality of optical fiber connectors. The adapter plate is releasable from the housing and providing access to both sides of the adapter plate. The cassette further includes a radius limiter nested with and resiliently connected to the base housing, a first expansion housing having an exterior contour substantially aligned with the base housing and configured to resiliently interlock with the base housing, and a cover resiliently connected to the expansion housing.

18 Claims, 16 Drawing Sheets

MODULAR OPTICAL FIBER CASSETTE

CROSS REFERENCE TO RELATED APPLICATIONS

The present application is a continuation-in-part (CIP) of U.S. patent application Ser. No. 12/286,554, filed on Sep. 30, 2008, and entitled "Modular Optical Fiber Cassettes and Fiber Management Methods," which claims priority to U.S. Provisional Application No. 60/997,170, filed on Oct. 1, 2007, the disclosures of which are incorporated in their entirety herein by reference.

BACKGROUND

An optical fiber (e.g., glass, plastic) carries light along its length. Light is kept in the core of the optical fiber by internal reflection. The optical fiber acts as a waveguide. Optical fiber can be used as a communication medium for telecommunication and networking applications because it is flexible and can be bundled into cables. Although referred to as "optical fiber," optical fiber is not restricted to communicating light in the visible spectrum, and may transmit light signals of higher, or lower, wavelengths.

Optical fiber is especially advantageous for communications because light propagates through the fiber with less attenuation than for electrical signals using metal wires. This facilitates long distance communications using with few repeaters. And unlike electrical communication modes, light signals are immune to electromagnetic interference, thereby eliminating cross-talk between signals and the effects of environmental noise. Non-armored optical fiber cables do not conduct electricity, which makes optical fiber a good solution for protecting communications equipment located in electrically-exposed environments, including communication structures prone to lightning strikes.

Optical fiber permits transmission at higher bandwidths (e.g., data rates) than other forms of communications. Per-channel light signals propagating in the fiber can be modulated at rates in the range of gigabits per second. An individual optical fiber can carry many independent channels, each using a different wavelength of light and wavelength-division multiplexing (WDM). Optical fiber saves space in cable ducts because a single optical fiber can carry much more data than a single electrical cable.

A fiber optic cable is usually made up of many individual optical fibers. For example, according to one commercially available configuration, twelve (12) 250 micron optical fibers may be grouped together in a buffer tube. A fiber optic cable may contain 6 buffer tubes (i.e., for a total of 72 optical fibers) and one or more strength members (e.g., metallic member), with the buffer tubes and strength member being surrounded by a jacket providing physical and environmental protection. Other commercially available fiber optic cable configurations may include 144 optical fibers (e.g., 12 buffer tubes of 12 optical fibers each), or 288 optical fibers (e.g., 12 buffer tubes of 12 optical fibers each), among others.

Individual optical fibers (e.g., glass, plastic) can be fragile, and require measures to prevent fracturing, or breakage. Optical fiber can be subject to physical routes limited to a minimum bend radius, at the cable level and/or at an individual fiber level, to prevent fracturing, breakage, or signal distortions/losses. In addition, optical fibers may be damaged if they are subjected to excessive tension or physical impact. Due to the risk of damage, it is preferable to avoid handling individual fibers any more than is necessary.

Optical fibers are increasingly being used to provide signal transmission between various service providers (e.g., telephone systems, video systems, computer network, etc.) and individual users (e.g., homes, businesses). Fibers which support many propagation paths or transverse modes are called multi-mode fibers (MMF), while those which can only support a single mode are called single-mode fibers (SMF). MMF generally have a larger core diameter, and is used for short-distance communication links, and SMF is used for longer distance communication links. Working with optical fiber (e.g., splicing, splitting, patching) involves close tolerances, and is best accomplished in controlled environments where physical alignments, temperature, and cleanliness are better managed to facilitate precision work results.

Optical fiber connection apparatuses, such as outside plant distribution cabinets, distribution frames, patch panels, splice terminations are used wherever the interconnection or cross-connection of multiple optical fibers is required. For example, optical fiber cable comprising numerous individual fibers may enter a distribution cabinet, fiber frame, or patch panel for connection to the individual optical fibers that split off to provide service to homes or businesses. Often, it is desirable that such optical fiber management, and/or optical fiber connection apparatus, allow for the interconnection of a large number of individual fibers in as small a space as possible (e.g., high density connections).

It is further desirable to make the work of technicians installing and servicing the optical fiber connection apparatuses and associated optical fibers as simple as possible. Previous patch panel approaches mimicked electrical termination cabinets. Traditional central office fiber management uses a fixed bulkhead design and costly radius and physical fiber protection inside an overall housing. While these apparatus provide some protection to the connectors and fibers, the fibers may then typically be routed only through the top and bottom of the unit or only through slots in the side of the unit. Density is therefore sacrificed to gain protection of the connectors and fibers.

DETAILED DESCRIPTION

Figure 1:
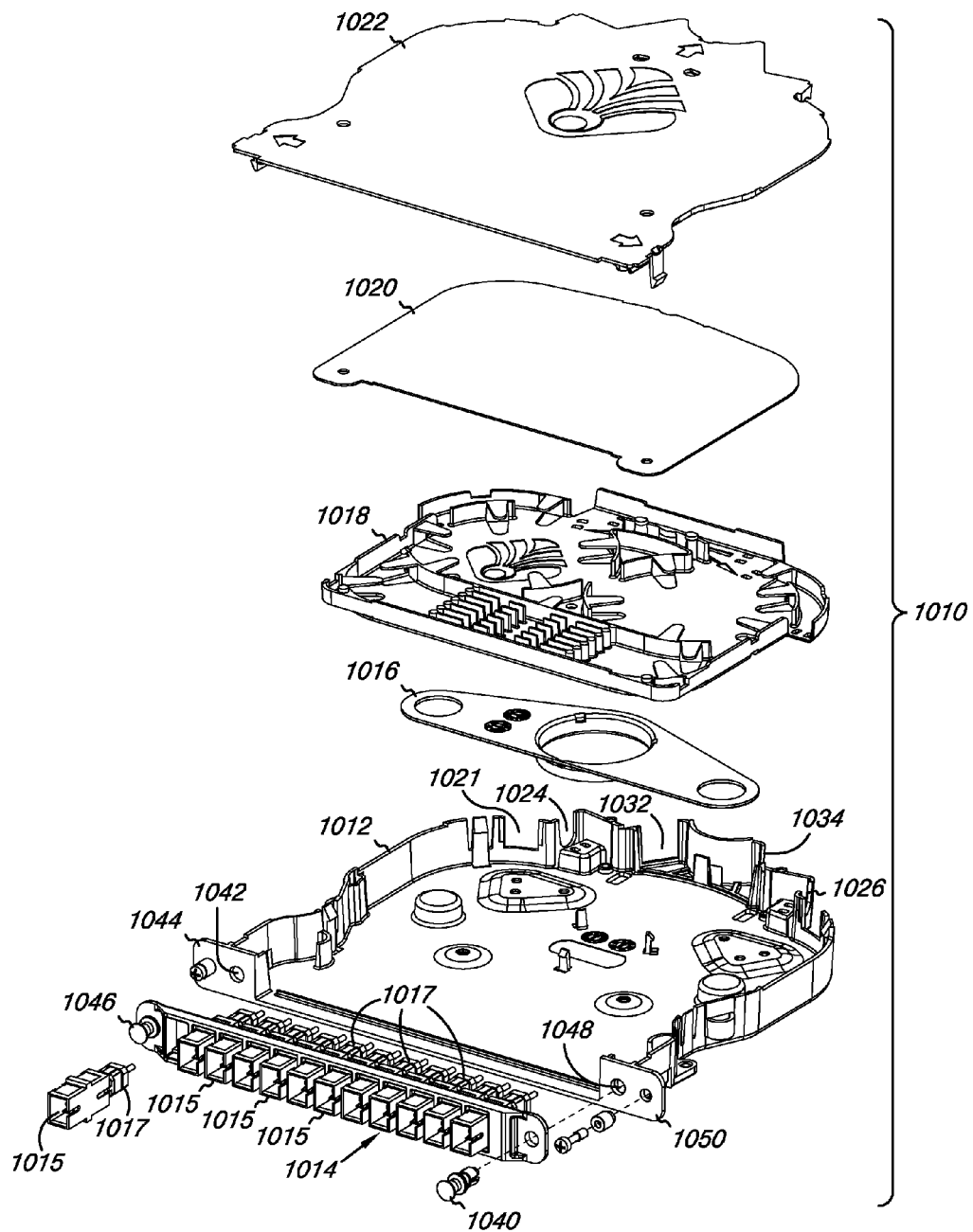
FIG. 1 is an exploded perspective view of a modular optic fiber cassette in accordance with one or more embodiments of the present disclosure.

The present disclosure includes apparatus and methods for a modular optical fiber cassette. One embodiment includes a base housing configured to receive additional nested components and an adapter plate resiliently connected to the housing and comprising a plurality of optical fiber connectors. The adapter plate is releasable from the housing and providing access to both sides of the adapter plate. The cassette further includes a radius limiter nested with and resiliently connected to the base housing, a first expansion housing having an exterior contour substantially aligned with the base housing and configured to resiliently interlock with the base housing, and a cover resiliently connected to the expansion housing.

The present disclosure provides modular cassettes and methods for fiber management applications that satisfy all the basic principals of fiber management with such cassettes. Cassettes in accordance with the present disclosure comprise plural functional components that nest into a main housing portion to support various application and fiber types. In accordance with the present disclosure, such components can be added or removed depending on the application and configuration needs of the use environment. Advantageously, cassettes in accordance with the present disclosure incorporate resilient connections and nested internal components for easy assembly and disassembly with minimal fasteners and/or tools.

Furthermore, the present disclosure provides cable management cassettes and management techniques that include one or more of the following capabilities: patch only configuration by configuring a cassette to not include a splice tray thereby saving installed costs; patch and splice configuration to reduce costs without giving up convenience and/or the quality of splicing that traditional patch-only environments provide when multi-buffer tubes or subunit cable is being used; reducing risk by eliminating as much interaction with fiber jumpers and tail as possible by having a removable adapter plate allowing access to both sides of connectors for installation, cleaning and maintenance, particularly when in-service; and permitting modularity in the quantity of fiber being managed to balance present capital costs with future expandability.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. The last three digits of reference numbers correspond to an item, with preceding digits corresponding to the drawing number. For example, one cassette embodiment of the present disclosure is indicated by the reference number 1010 with respect to FIG. 1, and a similar cassette embodiment is indicated by the reference number 2010 with respect to FIG. 2.

FIG. 1 is an exploded perspective view of a modular optic fiber cassette in accordance with one or more embodiments of the present disclosure. Modular optical fiber cassette 1010 (hereinafter "cassette"), as shown, comprises a base housing 1012, adapter plate 1014, radius limiter 1016, splice tray 1018, splice tray cover 1020, and housing cover 1022.

While cassette 1010 is shown in FIG. 1 as including all of the above-mentioned components, embodiments of the present disclosure are not so limited, and a particular cassette 1010 may be assembled to include additional components not shown in FIG. 1, or less than all the components illustrated in FIG. 1, depending on a particular application for cassette 1010.

Cassettes in accordance with the present disclosure can be used for both inside and outside plant environments. Cassettes in accordance with the present disclosure are made from materials suitable for harsh outside plant environments. Such cassettes are scalable to provide a range of port density and application needs.

One or more fiber optic cables comprising plural individual fibers may be provided to cassette 1010, for example, through openings 1021, 1024, 1026, 1032, and 1034, among others. Such fiber optic cable may be broken out to (distributed as) individual fibers within cassette 1010. Minimum bend radius specifications for such fibers can be maintained by cassette 1010 such as by using radius limiter 1016, for example. Cassette 1010 can also facilitate splitting or splicing individual fibers of a fiber optic cable to adapter plate 1014, which provides plural connectors 1015 (e.g., twelve, as illustrated) for connecting to individual fibers (e.g., of the fiber optic cable provided to cassette 1010).

Advantageously, cassette 1010 is modular and individual components of cassette 1010 functionally nest with each other for easy reliable assembly, disassembly, and/or maintenance. Moreover, cassette 1010 utilizes resilient connections, such as snap-fit connections, for example, which provides the ability to assemble and disassemble cassette 1010 with minimal or no tools and/or fasteners.

Advantageously, housing 1012, radius limiter 1016, splice tray 1018, splice tray cover 1020, and housing cover 1022 of cassette 1010 comprise substantially clear plastic or the like allowing for a quick and easy first-step troubleshooting of unacceptable light leakage. By clear it is meant that the material used for cassette 1010 is at least partially transmissive of a desired wavelength or range of wavelengths usable for identifying problems with fibers within cassette 1010 such as breaks, fractures, cracks, or other unacceptable conditions. In a various embodiments, cassette 1010 comprises plastic that is at least partially transmissive of visible light so problems with fibers inside cassette 1010 can be visibly identified without opening cassette 1010. For example, light leakage indicative of connection problems is observable through plastic that is at least partially transmissive of light. Furthermore, when using colored buffer tubes following EIA/TIA color code (e.g., for 12 fiber bundles), a cassette that is at least partially transmissive of visible light (e.g., clear) permits easy identification of a particular fiber (e.g., identified by its particular color coding), or fiber number, if a break or other damage thereto has occurred.

In one or more embodiments, splice tray 1018 is configured to be substantially opaque while base housing 1012 and housing cover 1022 are clear. By substantially opaque it is meant that the material is not transmissive of a desired wavelength or range of wavelengths usable for identifying problems with fibers within cassette 1010. Splice tray 1018 is made of material that makes it easier to see an unacceptable condition of an optical fiber within cassette 1010 such as a break or crack or the like by providing contrast between a light signal in such optical fiber and splice tray 1018. As an example, colored plastic can be used such as black, blue, brown, or white, to make it easier to see an unacceptable optical fiber condition within cassette 1010 when being tested for such conditions. In this way, because base housing 1012 and housing cover 1022 are clear, troubleshooting can be performed without having to open the cassette to reveal the internal contents. Components of cassette 1010 may also be color coded in any desired way to aid in quickly identifying such components. For example, in one embodiment, radius limiter 1016 is made from blue plastic.

Cassette 1010 also comprises ruggedized plastic components suitable for harsh outside plant temperature and environmental conditions such as for use in outside plant cabinets for FTTx applications. Fiber to the home, business, premise, etc. is often referred to as FTTH (fiber to the home), FTTP (fiber to the premise) where FTTx is a generic term for all end-points of an all fiber network to an end user. Advantageously, cassette 1010, because of its modularity, can be used from central office to outside plant thereby reducing the learning curve and service turn-up time due to familiarity of cassette 1010 throughout the network.

Adapter plate 1014 comprises internal connectors 1017, which function to provide a connection between adapter plate 1014 and fibers within cassette 1010 and external connectors 1015, which function to connect fibers within cassette 1010 and other desired components. Adapter plate 1014 may comprise any desired number of connections. Adapter plate 1014 also comprises fastener 1040 used to attach adapter plate 1014 to opening 1042 in flange 1044 of base housing 1012 and fastener 1046 used to attach adapter plate 1014 to opening 1048 in flange 1050 of base housing 1012. Fasteners 1040 and 1046 can use resilient connections to attach adapter plate 1014 to base housing 1012. A resilient connection can comprise a flexible elastic portion that can flex or deflect to engage with a corresponding portion, which may be a flexible portion as well. Resilient connections can be engaged and disengaged, such as for assembly and disassembly of components, with minimal or no tools and/or fasteners. Conventional fasteners may be used, however, such as screws and bolts and the like.

Figure 2:
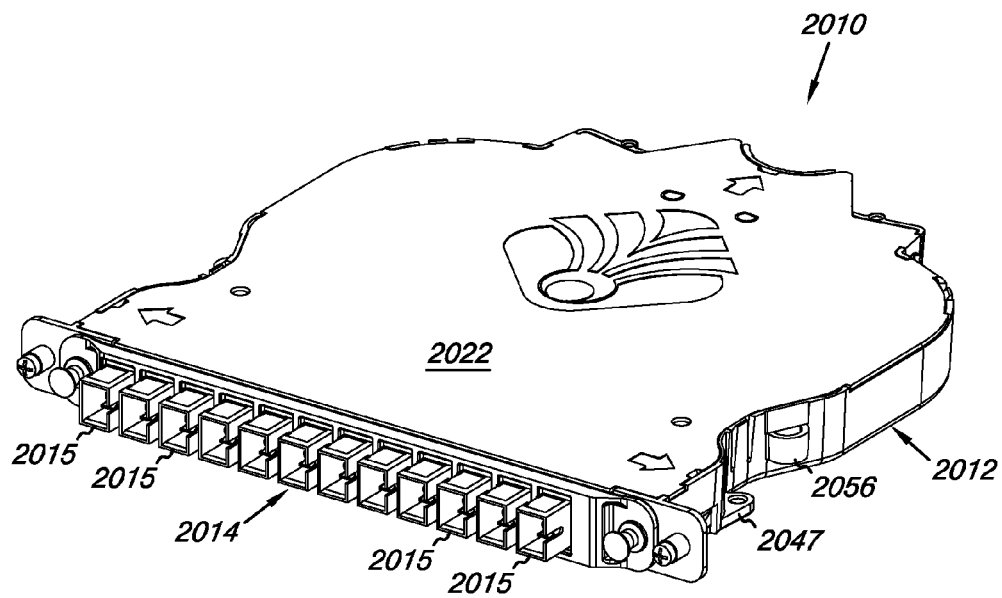
FIG. 2 is a top front perspective view of an assembled modular optic fiber cassette in accordance with one or more embodiments of the present disclosure.
Figure 3:
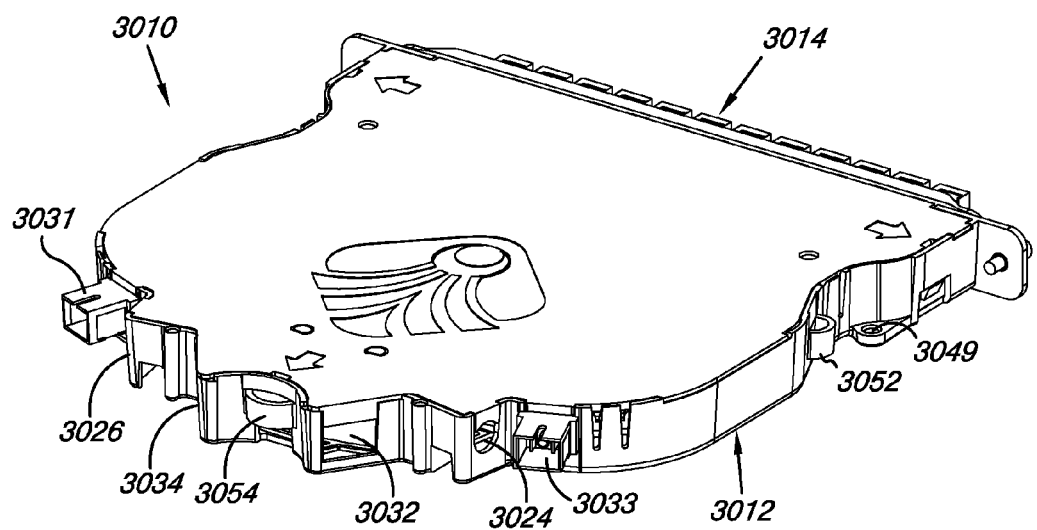
FIG. 3 is a top rear perspective view of the assembled modular optic fiber cassette of FIG. 2 in accordance with one or more embodiments of the present disclosure.

FIG. 2 is a top front perspective view, and FIG. 3 is a top rear perspective view, of an assembled modular optic fiber cassette in accordance with one or more embodiments of the present disclosure. A cassette (e.g., 2010 in FIG. 2 and/or 3010 in FIG. 3) can include a number of anchoring locations. For example, a right side anchor tab 2047 shown in FIG. 2 and/or a left side anchor tab 3049 shown in FIG. 3 can be used to mount or secure the cassette 2010 to another structure, such as a rack for rack mounting, wall, cabinet, frame, pedestal, etc. Right side anchor point 2056 shown in FIG. 2, left side anchor point 3052 and rear anchor point 3054 shown in FIG. 3. Anchor points 2056, 3052 and 3054 can be used to gang or group plural cassettes together into one block for easier installation and shipping, and therefore can also be referred to as "ganging loops."

The respective anchor points can be a loop extending from the base housing (e.g., 2012, 3012), as illustrated in FIGS. 2 and 3. According to one or more embodiments of the present disclosure, the anchor points are configured as loops of sufficient size to allow a cable tie (e.g., zip tie), for example, to be passed through the loop of adjacent cassettes, and thereby fastened together. The anchor points are arranged along the base housing (e.g., 2012) sidewall portion (e.g., 6058 indicated in FIG. 6) so as not to extend the across the entire vertical dimension thereof. In one or more embodiments, the anchor points are centrally located in the vertical dimension, with sufficient space above, below, or both above and below the anchor point to accommodate the closure portion of a cable tie in said space such that the closure portion of the cable tie is substantially vertically aligned with the anchor points, rather than extending horizontally beyond the anchor points.

As the cassettes are modular handling units of 12 fibers, the quantity of cassettes may be selected to accommodate a presently used fiber count, and subsequently modified to accommodate a different future fiber count. For example, a 288-port cabinet may be initially loaded with 144 ports (e.g., less than the full capacity of the cabinet) using 12 cassettes, each cassette terminating 12 fibers. If in the future there is a need for additional fiber capacity in the cabinet, a number of pre-terminated cassettes (e.g., 12 cassettes, each terminating 12 fibers, for a total of an additional 144 fibers) can be added to the cabinet. The 12 new cassettes can be ganged (e.g., fastened) together into a solid block for easier installation and handling.

Port capacity can be added in patch only, or patch and splice, configurations. Cassettes having different configurations can be mixed and matched in a particular installation as desired or needed by a user. For example, a cabinet can be used to initially deploy one or more cassettes having a patch only configuration. Subsequently, due to previously unforeseen subscriber demand, additional cassettes having a patch and splice configuration can be added to the cabinet to accommodate the unforeseen demand or future growth. The capability to add cassettes of different configurations as needed over time, or even re-configuring particular cassettes of a given installation, facilitates a modular fiber management solution that avoids capital investment until needed, thereby lowering costs.

FIG. 3 is a top rear perspective view of the assembled modular optic fiber cassette of FIG. 2 in accordance with one or more embodiments of the present disclosure. FIG. 3 illustrates connectors 3031 and 3033 being operatively attached to cassette 3010 (e.g., at opening 1021, as shown in FIG. 1). In addition, one or more fiber optic cables (not shown) having plural fibers to be managed by cassette 3010 and distributed by adapter plate 3014 can be provided to cassette 3010 using openings 3024 and 3026 as shown in FIG. 3. Openings 3024 and 3026 are provided at opposite sides of cassette 3010, as illustrated, which provides easy access to one or both sides of cassette 3010 depending on how the cassette is used. Openings 3024 and 3026 can be used for entry and/or exit of fiber optic cables.

One or more fiber optic cables (not shown) having plural fibers to be managed by cassette 3010 and distributed by adapter plate 3014 can also be provided to cassette 3010 using openings, 3032 and 3034, as shown in FIG. 3. Openings, 3032 and 3034, are designed to receive connectors that can be used for plug-n-play applications where a fiber optic cable to be distributed using cassette 3010 comprise a suitable connector at an end of the fiber optic cable. Connectors 3032 and 3034 may comprise connectors such as those for multi-fiber optical ribbon connectors (e.g., MPT, MPO) where a 4, 8, or 12, etc. fiber ribbon is terminated into a single connector. The application of MTP/MPO provides plug-n-play functionality. A fiber assembly of a 12-fiber MTP connector broken out to individual 12-fiber circuits terminated to adapter plate 3014 of cassette 3010 allows a user to bring a pre-terminated MTP/MPO assembly to cassette 3010 and simply plug into the MTP/MPO adapter integrated with housing 3012.

Figure 4:
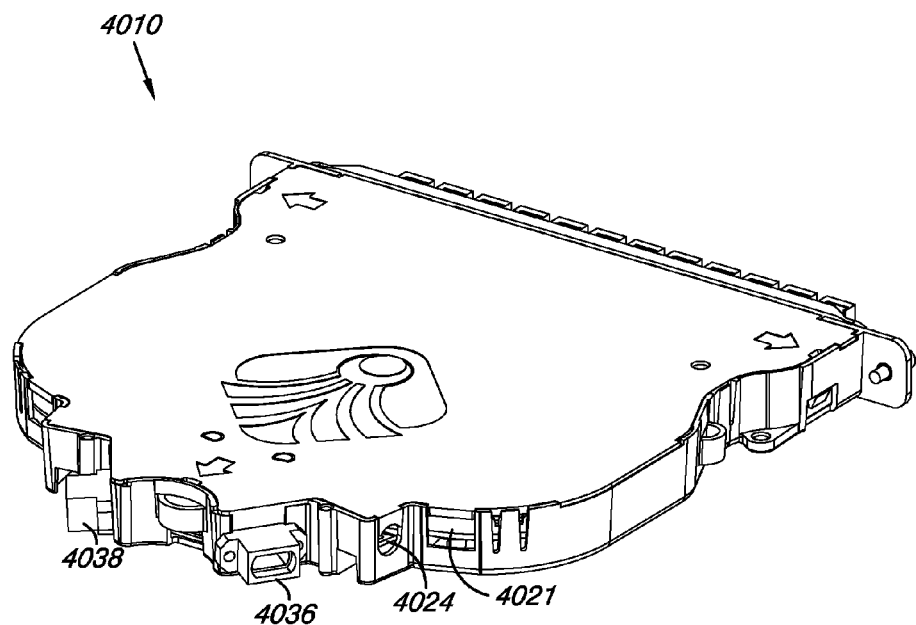
FIG. 4 is a top rear perspective view of a modular optic fiber cassette having a second configuration in accordance with one or more embodiments of the present disclosure.

FIG. 4 is a top rear perspective view of a modular optic fiber cassette having a second configuration in accordance with one or more embodiments of the present disclosure. FIG. 4 illustrates connectors 4036 and 4038 being operatively attached to cassette 4010 (e.g., at respective openings 3032 and 3034, as shown in FIG. 3). Opening 4024 (similar to opening 1024 in FIG. 1) and opening 4021 (similar to opening 1021 in FIG. 1) are also shown in FIG. 4 for reference.

Figure 5:
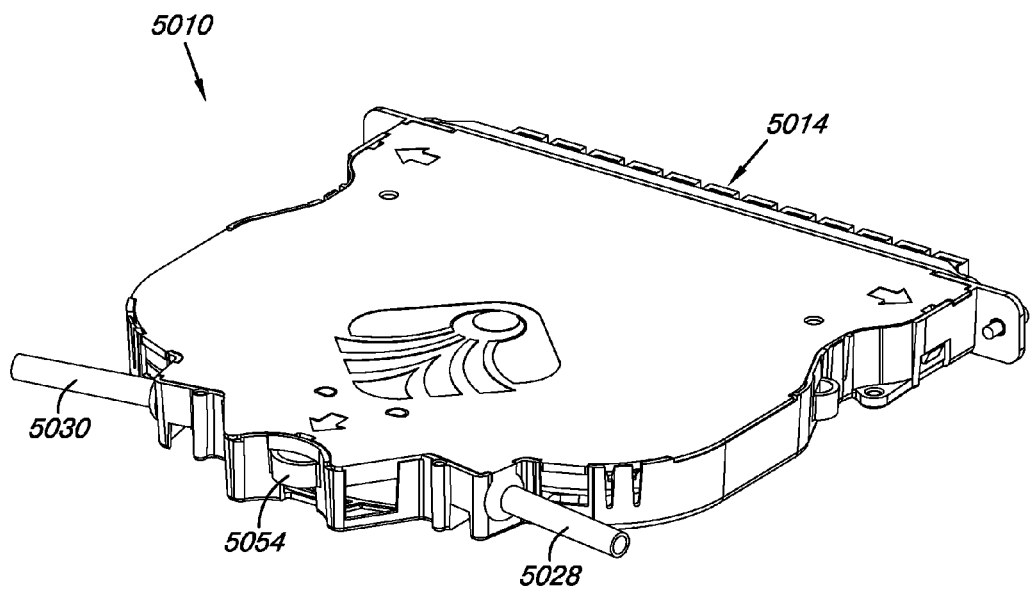
FIG. 5 is a top rear perspective view of a modular optic fiber cassette having a third configuration in accordance with one or more embodiments of the present disclosure.

FIG. 5 is a top rear perspective view of a modular optic fiber cassette having a third configuration in accordance with one or more embodiments of the present disclosure. FIG. 5 illustrates strain relief tubes 5028 and 5030 being operatively attached to cassette 5010 (e.g., at respective openings 3024 and 3026 in FIG. 3). However, embodiments of the present disclosure are not limited to the particular strain relief tubes 5028 and 5030 shown in FIG. 5, and other grommets, clamps, and/or strain relief tube configurations compatible with a particular opening geometry of the cassette entry/exit points can be used to provide appropriate security to a fiber optic cable being terminated to cassette 5010 using the rear openings (e.g., 3024 and 3026 shown in FIG. 3). Anchor point 5054 is indicated on the rear of cassette 5010, similar to anchor point 3054 on cassette 3010 in FIG. 3. Adapter plate 5014, comprising multiple external connectors 1015, similar to adapter plate 2014 and connectors 2015 in FIG. 2, are also shown in FIG. 5.

Figure 6:
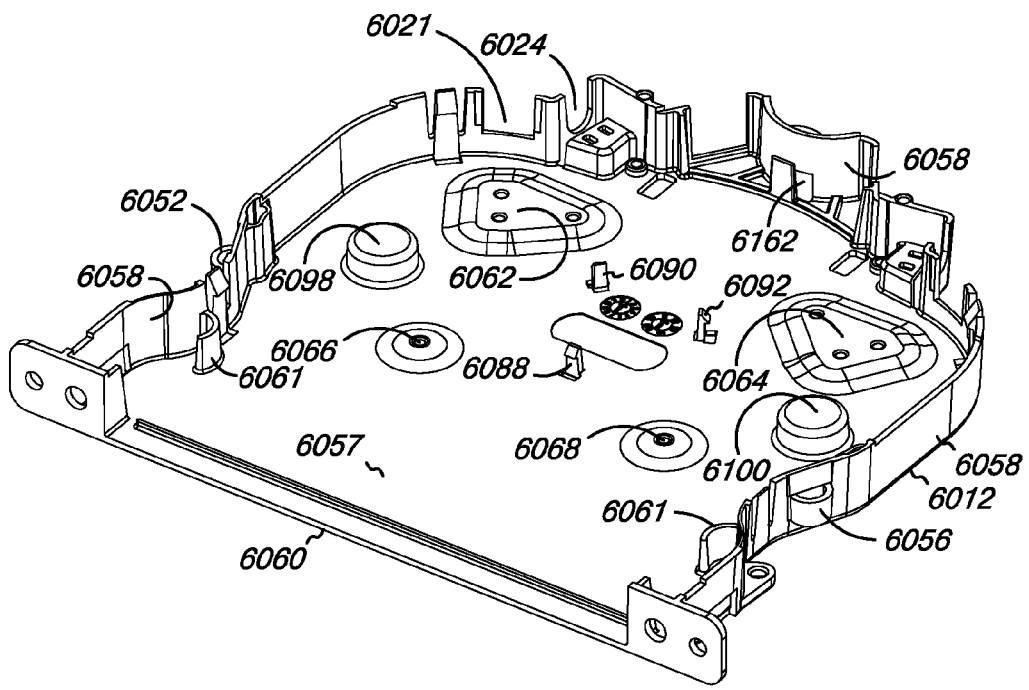
FIG. 6 is a top front perspective view of a modular optic fiber cassette housing in accordance with one or more embodiments of the present disclosure.

FIG. 6 is a top front perspective view of a modular optic fiber cassette housing in accordance with one or more embodiments of the present disclosure. FIG. 6 illustrates a base housing 6012 in greater detail than FIG. 1. Base housing 6012 comprises a floor portion 6057, one or more sidewall portions 6058 substantially perpendicular to the internal floor portion 6057, and a front opening 6060 for receiving an adapter plate (e.g., 1014 shown in FIG. 1).

Base housing 6012 includes a number of openings (e.g., 6021, 6024, among others) through which one or more fiber optic cables may enter base housing 6012, for example, through different style connectors as shown in FIGS. 3-5, among others. FIG. 6 also illustrates a top view of anchor points 6052 and 6056, showing the vertical offset away from the top edge of the sidewall portion 6058 of the base housing 6012.

Figure 18:
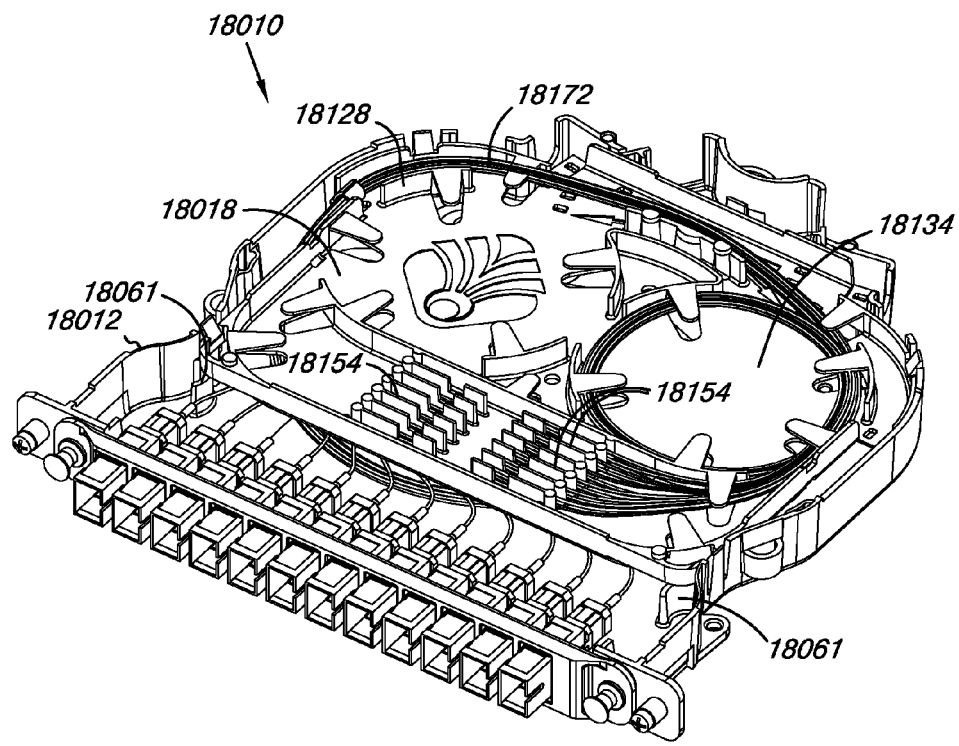
FIG. 18 is a front perspective view of a modular optic fiber cassette housing having a pre-loaded splice tray nested in the optic fiber cassette housing in accordance with one or more embodiments of the present disclosure.
Figure 20:
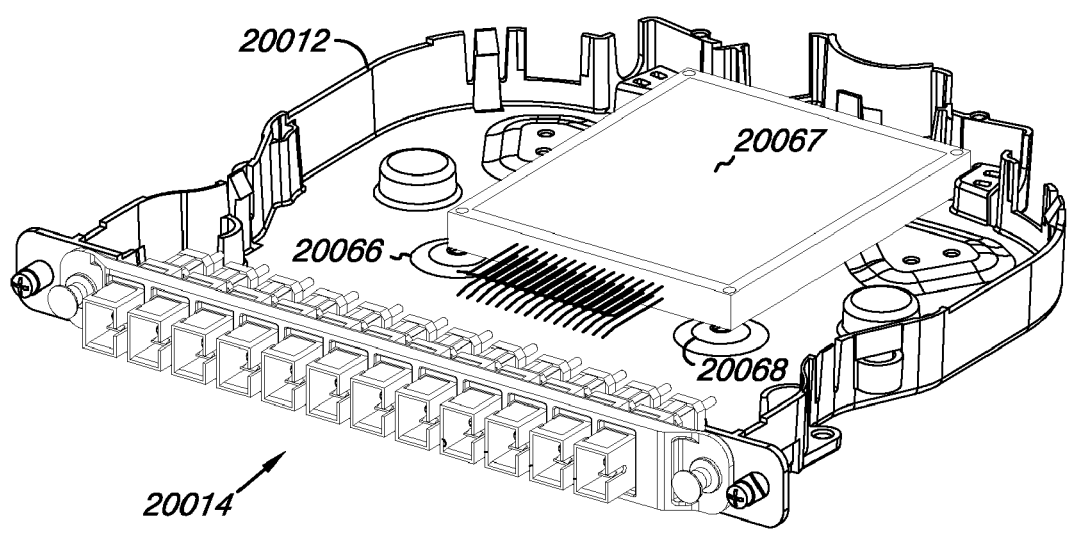
FIG. 20 is a front perspective view of a modular optic fiber cassette housing having a modular optical component nested in the optic fiber cassette housing in accordance with one or more embodiments of the present disclosure.

Floor portion 6057 can include mounting regions 6062, 6064, 6068, and 6066, which may be raised regions or standoffs as viewed from the inside of housing 6012. Mounting regions 6062, 6064, 6066, and 6068 function to provide internal attachment points for optical components, if used, which are shown in FIG. 20 and discussed later. Floor portion 6057 can also include bosses 6098 and 6100, for mating with a radius limiter (e.g., 1016 in FIG. 1), and one or more standoffs 6061, upon which nested components (e.g., splice tray 1018 shown in FIG. 1) can be supported. The one or more standoffs 6061 also keep slack stored fiber confined to a particular route path within the cassette. FIG. 18 further illustrates this feature.

Base housing 6012 includes a number of engaging arms 6088, 6090, and 6092. Engaging arms 6088, 6090, and 6092 comprise hook portions at the end of each arm that engage with notches (e.g., 9082, 9084, and 9086 shown in FIG. 9) located in the central hub of the radius limiter (e.g., 1016 shown in FIG. 1), when the radius limiter is nested with the base housing 6012. Engaging arms 6088, 6090, and 6092 can be resilient and flex to engage with the radius limiter notches when assembled.

Figure 7:
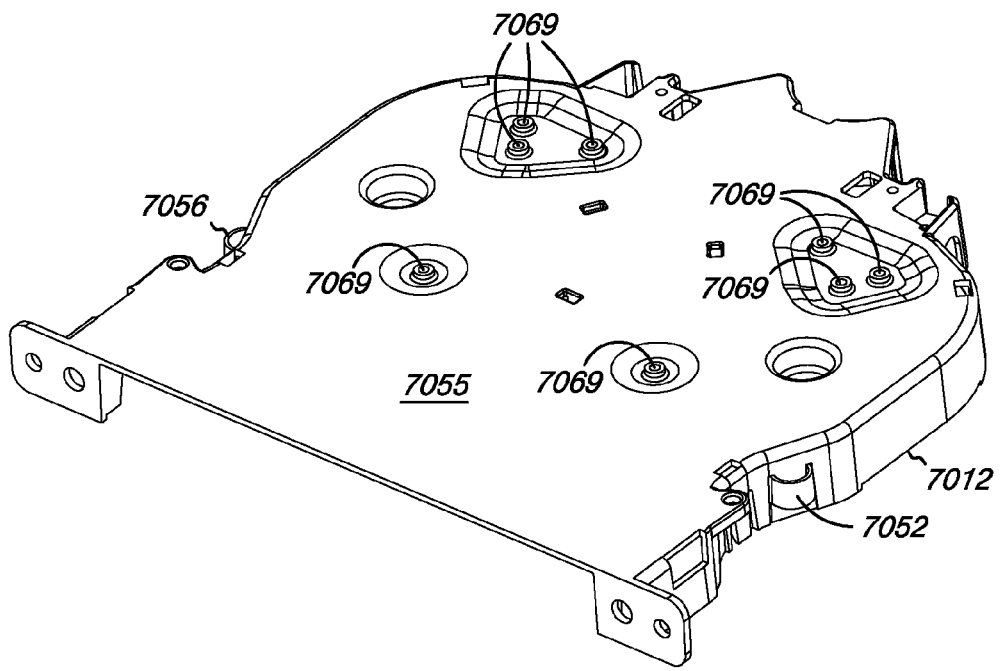
FIG. 7 is a bottom front perspective view of the modular optic fiber cassette housing of FIG. 6 in accordance with one or more embodiments of the present disclosure.

FIG. 7 is a bottom front perspective view of the modular optic fiber cassette housing of FIG. 6 in accordance with one or more embodiments of the present disclosure. The external portion of mounting regions 6062, 6064, 6066, and 6068 can include bosses 7069 that extend from the bottom surface 7056 of the base housing 7012, providing additional material to secure a screw used to attach an optical component into base housing 7012 (see also FIG. 20). FIG. 7 also illustrates a bottom view of anchor points 7052 and 7056, showing the vertical offset away from the bottom surface 7055 of the base housing 7012.

Figure 8:
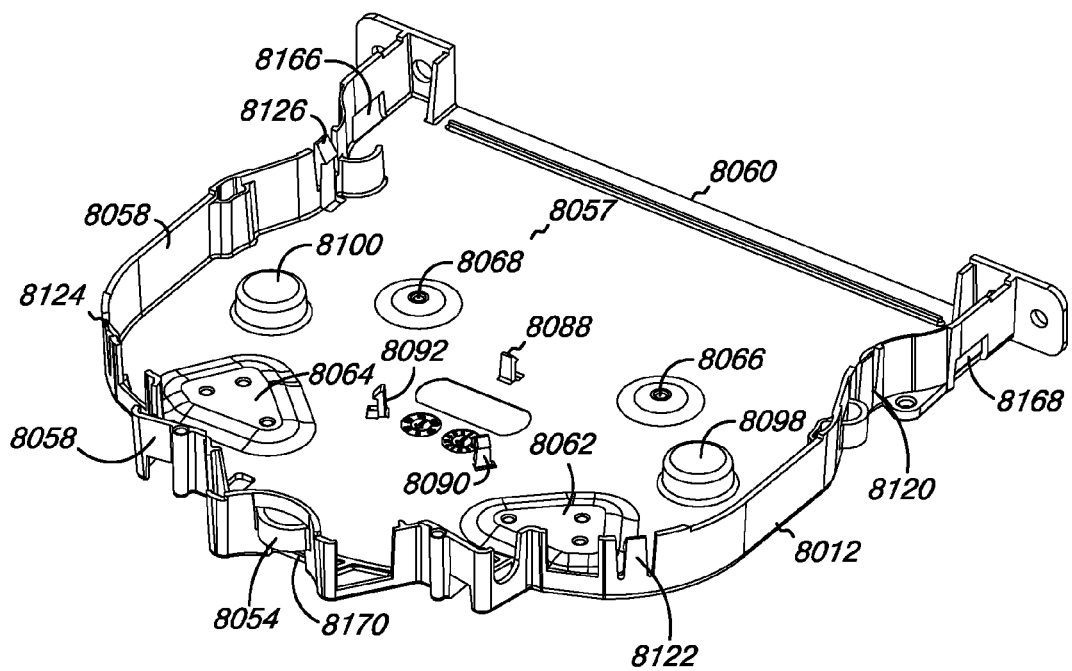
FIG. 8 is a top rear perspective view of the modular optic fiber cassette housing of FIG. 6 in accordance with one or more embodiments of the present disclosure.

FIG. 8 is a top rear perspective view of the modular optic fiber cassette housing of FIG. 6 in accordance with one or more embodiments of the present disclosure. As was similarly described with respect to FIG. 6, base housing 8012 comprises a floor portion 8057, one or more sidewall portions 8058 substantially perpendicular to the internal floor portion 8057, and a front opening 8060 for receiving an adapter plate (e.g., 1014 shown in FIG. 1). Floor portion 8057 can include mounting regions 8062, 8064, 8068, and 8066, which may be raised regions or standoffs as viewed from the inside of housing 8012.

Mounting regions 8062, 8064, 8066, and 8068 function to provide internal attachment points for optical components, if used, which are shown in FIG. 20 and discussed later. Mounting regions (e.g., 8062, 8064) can be configured to provide multiple attachment points so as to accommodate a variety of component sizes, configurations, and/or multiple mounting positions; or provide a singular attachment point (e.g., 8066, 8068). Floor portion 8057 can also include bosses 8098 and 8100, for mating with a radius limiter (e.g., 1016 in FIG. 1). FIG. 8 also illustrates a top view of anchor point 8054, showing the vertical offset away from the top edge of the sidewall portion 8058 of the base housing 8012.

Figure 9:
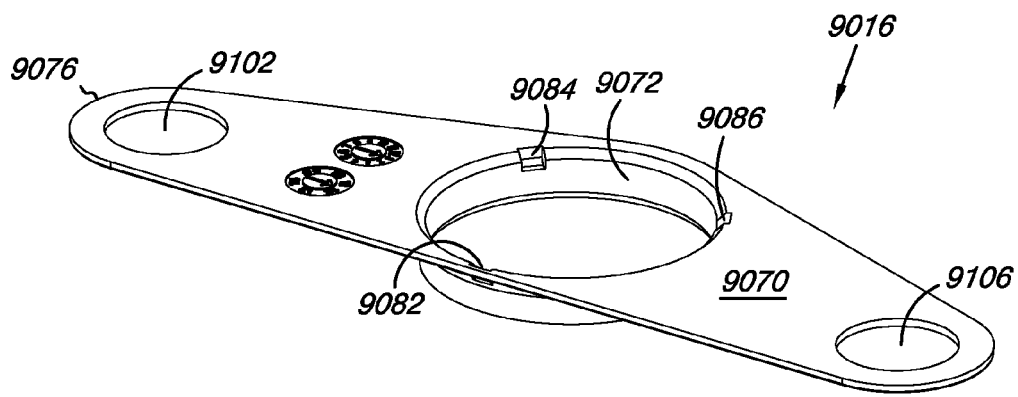
FIG. 9 is a top perspective view of a radius limiter in accordance with one or more embodiments of the present disclosure.

FIG. 9 is a top perspective view of a radius limiter in accordance with one or more embodiments of the present disclosure. As shown in FIG. 9, the radius limiter 9016 comprises base portion 9070 and central hub 9072. Base portion 9070 comprises arcuate sides (e.g., 9076), which generally provide an elongate shape.

Central hub 9072 includes notches 9082, 9084, and 9086 that mate with arms 8088, 8090, and 8092 of housing 8012, respectively, when assembled in base housing 8012 as shown in FIG. 8. Arms 8088, 8090, and 8092 comprise hook portions at the end of each arm that engage with notches 9082, 9084, and 9086, when assembled. Arms 8088, 8090, and 8092 are releasable for disassembly. Arms 8088, 8090, and 8092 are resilient and flex to engage with notches 9082, 9084, and 9086 when assembled. Advantageously, the combination of arms 8088, 8090, and 8092 and notches 9082, 9084, and 9086 provides easy assembly and disassembly of radius limiter 9016 with housing 8012 (shown in FIG. 8). embodiments of the present disclosure are not limited to the type of fastening apparatus illustrated in the accompanying drawings (e.g., arms 8088, 8090, and 8092 and notches 9082, 9084, and 9086), and one or more embodiments of cassettes may be configured to stabilize nested components using other type fasteners, interference fits, or snap-fit structures, among others.

Radius limiter 9016 can include openings 9102 and 9106, that mate with bosses 8098 and 8100, respectively, of base housing 8012 when assembled. Radius limiter 9016 may also include additional (e.g., optional) openings to minimize the amount of material needed to fabricate radius limiter 9016.

Figure 10:
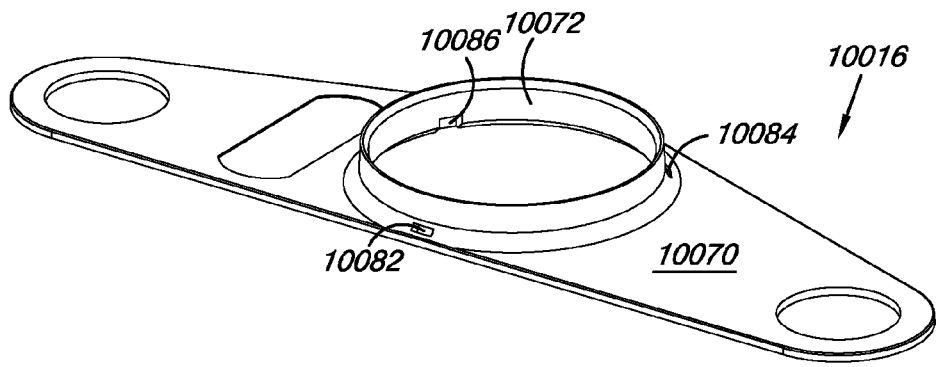
FIG. 10 is a bottom perspective view of the radius limiter of FIG. 9 in accordance with one or more embodiments of the present disclosure.

FIG. 10 is a bottom perspective view of the radius limiter of FIG. 9 in accordance with one or more embodiments of the present disclosure. FIG. 10 illustrates a bottom view of notches 10082, 10084, and 10086, as well as the underside of the base portion 10070 and central hub 9072.

Central hub 10072 of radius limiter 10016 is designed with a radius that corresponds with a predetermined minimum bend radius for a particular fiber being managed by a particular cassette (e.g., 1010 shown in FIG. 1). Also, radius limiter 10016 is designed to be large enough to hold a pre-terminated fiber assembly captive to surface 8057 of base housing 8012 (see FIG. 8). When adapter plate (e.g., 1014) is exercised from the front of a cassette (e.g., 1010), the radius limiter (e.g., 10016) functions to prevent fibers from having an unacceptably small radius or bend. Radius limiter 10016 also functions to prevent fibers from jumping over radius limiter 10016 and possibly creating unacceptable micro bends caused by pinch points resulting in radius violations.

Figures 11, 12:
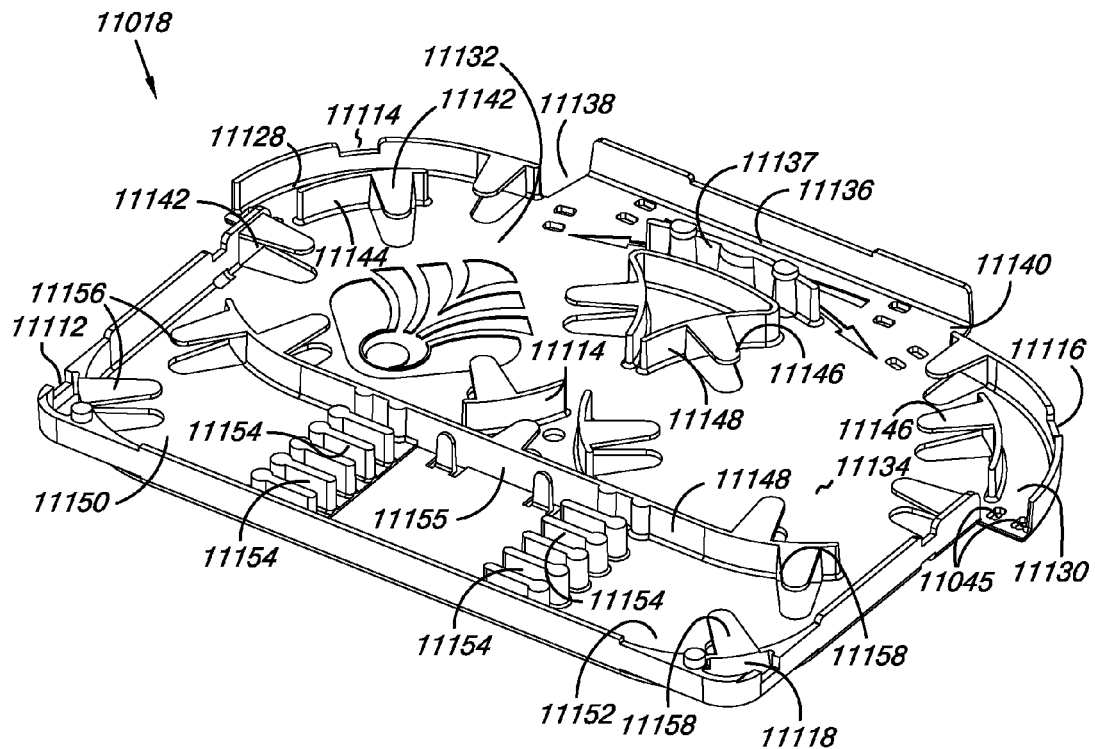
FIG. 11 is a top front perspective view of a splice tray in accordance with one or more embodiments of the present disclosure.
FIG. 12 is a bottom front perspective view of the splice tray of FIG. 11 in accordance with one or more embodiments of the present disclosure.
Figure 13:
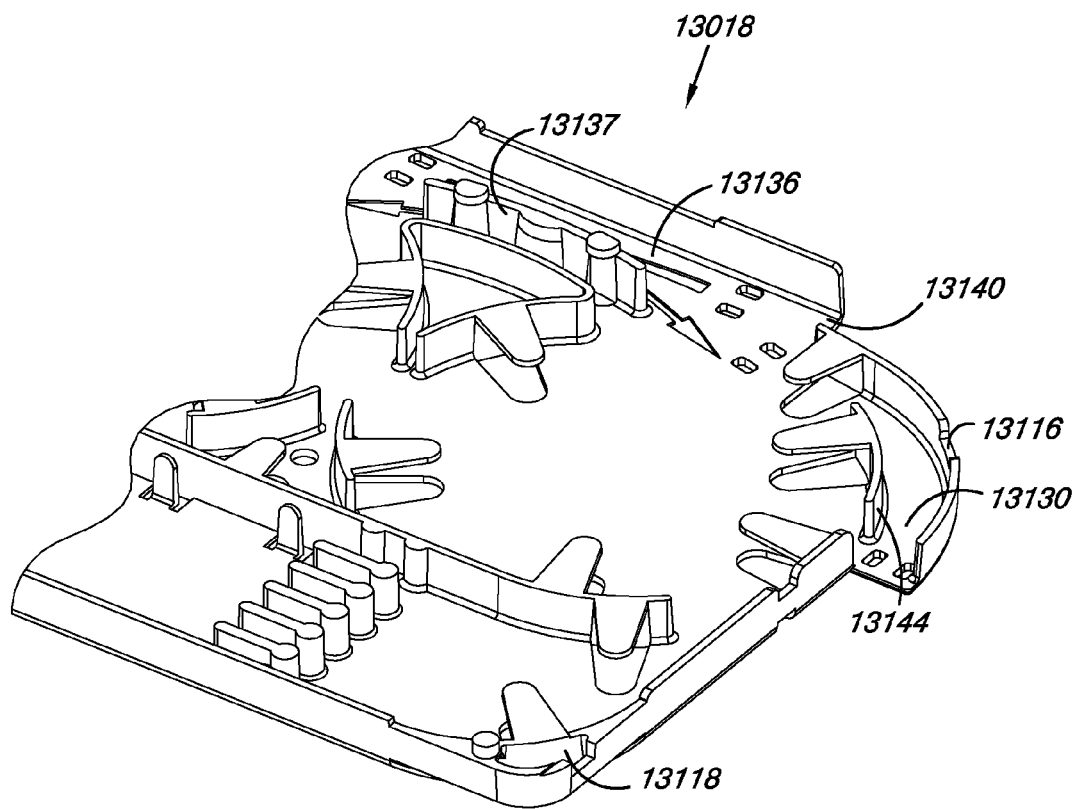
FIG. 13 is a detail view of a portion of the splice tray of FIG. 11 showing in particular a fiber nest and splice channels in accordance with one or more embodiments of the present disclosure.

FIG. 11 is a top front perspective view of a splice tray in accordance with one or more embodiments of the present disclosure. FIG. 12 is a bottom front perspective view of the splice tray of FIG. 11 in accordance with one or more embodiments of the present disclosure, and FIG. 13 is a detail view of a portion of the splice tray of FIG. 11 showing in particular a fiber nest and splice channels in accordance with one or more embodiments of the present disclosure. Splice tray (e.g., 11018, 12018, and 13028) is shown in greater detail in FIGS. 11-13.

Splice tray 11018 functions as a second level of fiber management within a cassette (e.g., 1010 in FIG. 1). As shown in FIG. 11, splice tray 11018 provides a second level that is physically segregated from the first level of fiber management (e.g., base 6057 of housing 6012) in that such surfaces are generally parallel. For additional physical segregation, splice tray 11018 may be covered within the cassette (e.g., such as by cover 1020 shown in FIG. 1).

Splice tray 11018 comprises notches 11112, 11114, 11116, and 11118 that can engage with resilient releasable arms (e.g., 8120, 8122, 8124, and 8126 shown in FIG. 8) to attach splice tray 11018 to housing 8012. Splice tray 11018 also includes raceways 11128 and 11130 that can be used to guide fibers within a cassette (e.g., 1010) between the first level (e.g., base 6057 of housing 6012) and the second level (e.g., the splice tray 11018) of a cassette (e.g., 1010). Raceways 11128 and 11130 function as ramps and guides to help transition optical fiber between the first and second levels.

Further referring to FIG. 11 in particular, splice tray 11018 can also include channel 11136 and openings 11138 and 11140 that function as entrances and/or exits for a fiber optic cable to enter or exit channel 11136. Channel 11136 is defined in part by the back exterior wall of the splice tray 11018 and channel wall 11137. Channel wall 11137 also functions to support, in part, the splice tray cover (e.g., 1020 shown in FIG. 1), which can rest upon the channel wall 11137. The raised bosses shown incorporated into channel wall 11137 can additionally serve as a "snap down" point for mechanically attaching a splice tray cover (e.g., 1020 shown in FIG. 1) to the splice tray 11018.

Splice tray 11018 can be nested within the housing (e.g., 3012) such that a splice tray entry/exit opening 11130 receives a fiber optic cable provided by base housing opening (e.g., 3024 in FIG. 3), and splice tray opening 11132 receives a fiber optic cable provided by entry/exit opening (e.g., 3026 in FIG. 3). Lacing points 11045 can be provided at respective entry/exit openings of the raceways (e.g., 11130 and 11132), for example for securing the fiber optic cable, buffer tubes, or subunits, such as with wax lace or zip ties.

Fiber nests 11132 and 11134 are provided for storing and managing coiled lengths of fiber within the splice tray 11018 when nested within a cassette (e.g., 1010). Fiber nest 11132 can include one or more horizontal tabs 11142 that extend outwardly from vertical surfaces 11144 to partially define a radial channel for helping to contain coiled fiber within splice tray 11018. Similarly, fiber nest 11134 can include horizontal tabs 11146 that extend outwardly from surfaces 11148 to partially define a radial channel for helping to contain coiled fiber within splice tray 11018.

Splice tray 11018 also includes splice transition regions 11150 and 11152, and one or more splice channels (e.g., 11154, 11155). Region 11150 can include horizontal tabs 11156, which functions to guide fiber from nest 11132 to splice channels 11154, or from splice channels 11154 to fiber nest 11132. Likewise, region 11152 can include horizontal tabs 11158, which function to guide fiber to and from nest 11134 and splice channels 11154. Splice channels 11154 function to hold splicing tubes in place, both vertical and horizontally.

Splice tray 11018 includes a number of splice channels configured to hold splicing tubes and/or ribbon. For example, in the embodiment illustrated in FIG. 11 the splice tray 11018 includes six channels 11154 configured to hold splicing tubes (e.g., six splice channels each holding two splicing tubes) and one channel 11155 of a different configuration (e.g., size, shape) to accommodate larger splice sleeves for splicing ribbon. When two fibers are spliced together, a steel tube that protects the delicate splice point can be used to encapsulate the splice point. Heat shrink can be applied over the tube for moisture/humidity protection, with the tube being pressed down into channels 11154. According to one or more embodiments of splice tray 11018, two banks of channels 11154 are spaced apart so that a splicing tube can be accessed with fingers, or a tool. A splice tray cover (e.g., 1020 shown in FIG. 1) can be attached for added protection and retention of fibers within splice tray 11018.

FIG. 12 illustrates a bottom front perspective view of a splice tray 12018 in accordance with one or more embodiments of the present disclosure, showing an opposite perspective view of raceways 12128 and 12130. The reader will appreciate the various cut-outs shown in the bottom of the splice tray, corresponding to the horizontal tabs (e.g., 11156, 11158, 11146, etc.) to aid in fabrication of the splice tray 12018. FIG. 12 also shows the underside of lacing points 12045, illustrated in FIGS. 11 and 12 as being openings through the splice tray at respective entry/exit openings, the entry/exit openings corresponding to features of the base housing for routing fibers to/from the base housing and the splice tray.

FIG. 13 provides a close-up view of a fiber nest portion of a splice tray 13018, further illustrating raceway 13130, notch 13116, channel 13136, channel wall 13137, opening 13140, vertical surfaces 13144, horizontal tabs 13144, and notch 13118 as previously describe with respect to corresponding features shown in preceding figures in accordance with one or more embodiments of the present disclosure.

Figure 14:
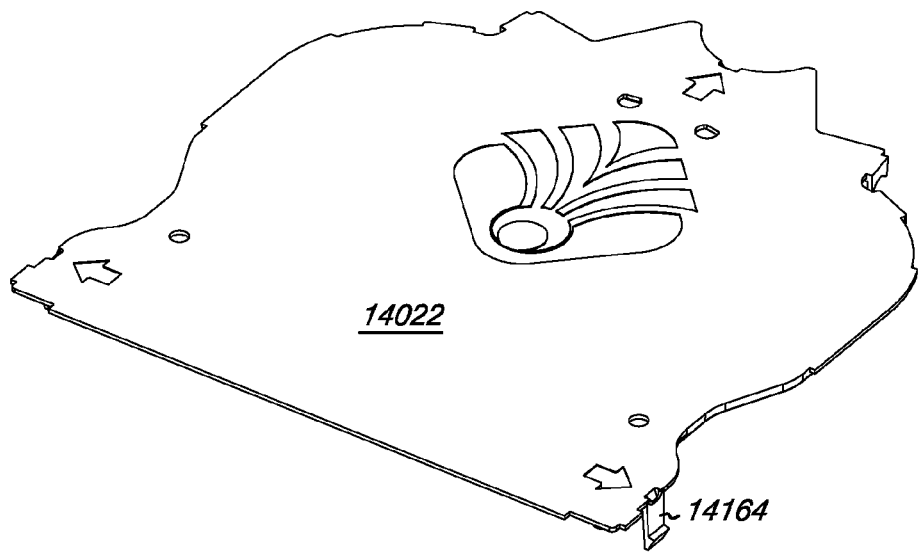
FIG. 14 is a top front perspective view of a modular optic fiber cassette housing cover in accordance with one or more embodiments of the present disclosure.
Figure 15:
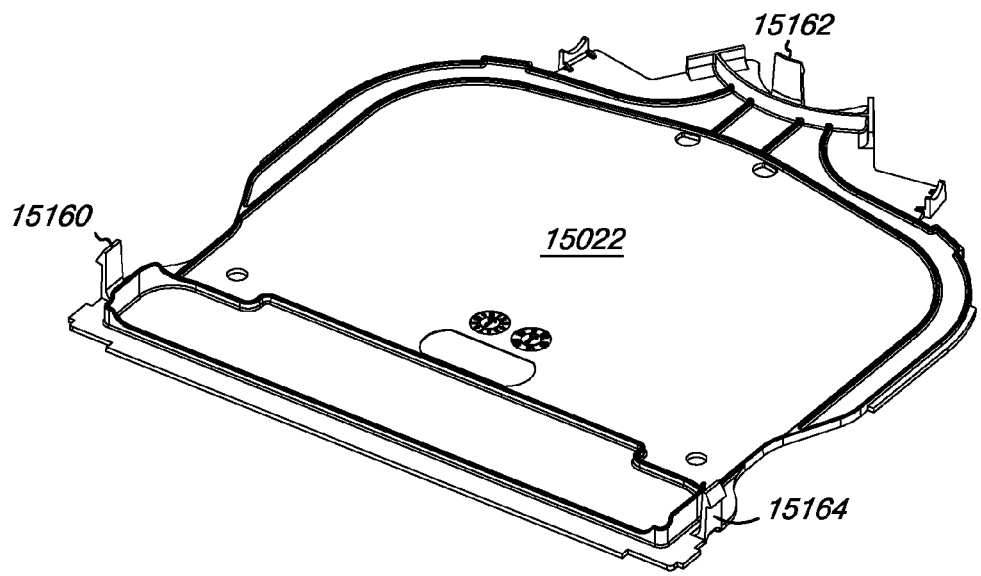
FIG. 15 is a bottom front perspective view of the modular optic fiber cassette housing cover of FIG. 14 in accordance with one or more embodiments of the present disclosure.

FIG. 14 is a top front perspective view of a modular optic fiber cassette housing cover in accordance with one or more embodiments of the present disclosure, and FIG. 15 is a bottom front perspective view of the modular optic fiber cassette housing cover of FIG. 14 in accordance with one or more embodiments of the present disclosure. Housing cover (e.g., 14022 in FIG. 14, 15022 in FIG. 15) is shown having one or more resilient releasable arms (e.g., 15160, 14164 shown in FIG. 14 corresponding to 15164 shown in FIG. 15, and 15162) that engage with notches 8166, 8168, and 8170 shown in FIG. 8, respectively, of base housing 8012 seen in FIG. 8. Housing cover 15022 also serves to hold the MTP/MPO adapters (e.g., 4036 and 4038 shown in FIG. 4 of cassette 4010. Housing cover (e.g., 14022, 15022) also engages with strain relief tubes (e.g., 5028 and 5030 shown in FIG. 5) to provide strain relief and bend radius protection for fragile incoming buffer tubes.

Figure 16:
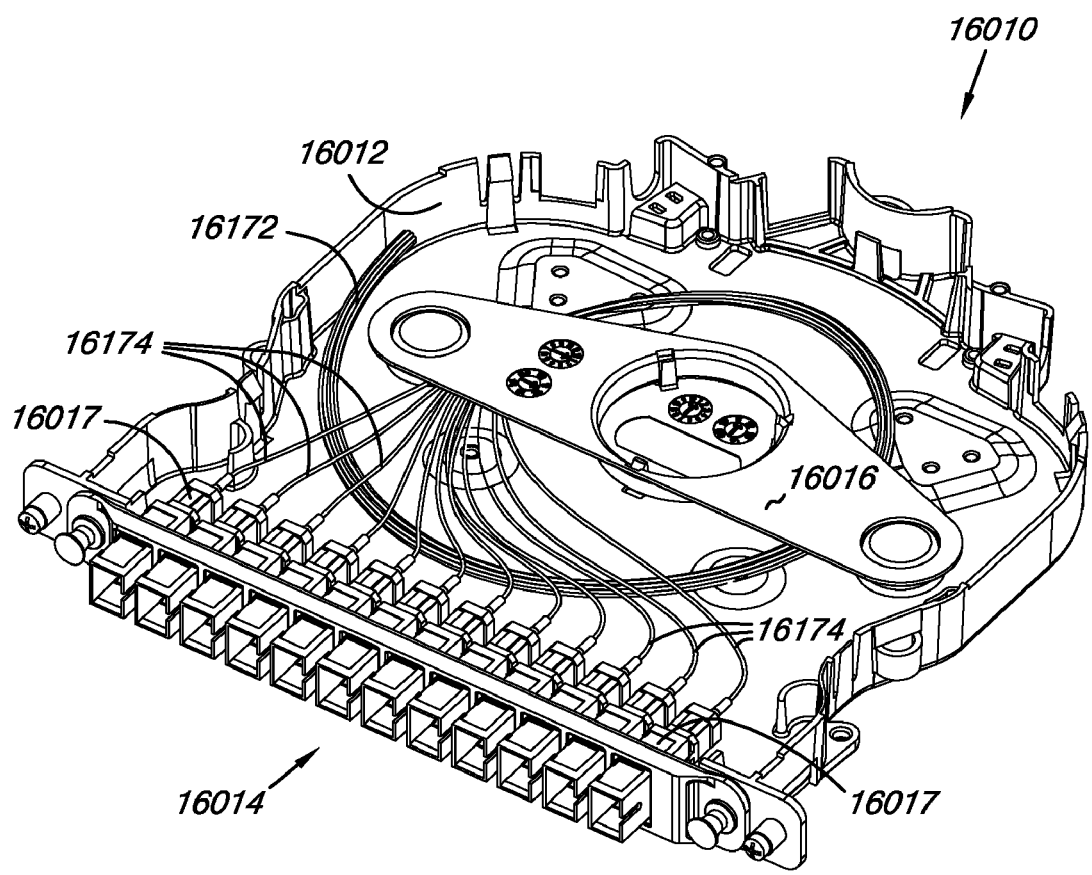
FIG. 16 is a front perspective view of a modular optic fiber cassette housing having a radius limiter nested in the optic fiber cassette housing with plural fibers (partial view) connected to an adapter plate and looped around the radius limiter in accordance with one or more embodiments of the present disclosure.

FIG. 16 is a front perspective view of a modular optic fiber cassette housing having a radius limiter nested in the optic fiber cassette housing with plural fibers (partial view) connected to an adapter plate and looped around the radius limiter in accordance with one or more embodiments of the present disclosure. FIG. 16 illustrates a configuration that can be used for patch only applications where cassette 16010 utilizes a housing 16012, radius limiter 16016 (for radius protection when adapter plate 16014 is extended away from the housing 16012), and a housing cover (e.g., 1022 in FIG. 1—not shown in FIG. 16).

Inside base housing 16012, fibers are connected on one end to connectors 16017, which are mounted on the detachable the adapter plate 16014. Fibers 16174 collectively form a fiber loop 16172, which is slack stored on the lower level of cassette 16010, the fiber loop 16172 being routed around radius limiter 16016. As previously discussed, radius limiter 16016 includes a central hub (e.g., 10072 in FIG. 10) having a diameter sized to limit the minimum radius of fiber loop 16172 for protection thereof, when for example, adapter plate 16014 is removed thereby pulling on fiber loop 16172 and reducing its slack. For patch only configurations (illustrated in FIGS. 16 and 17), fiber loop 16172 is routed and tied off, for example, just before a transition of the multi-fiber buffer tube (or subunits) to individual (e.g., discrete) fibers.

For added modularity, cassette 16010 supports MPO assemblies and adapters on the rear side of cassette 16010. Twelve industry standard terminations to twelve-fiber MPO ribbon terminations inside cassette 16010 provide a fully self-contained interconnect environment for modularity. MPO pre-terminated distribution or outside plant cables in all constructions and fiber counts are supported allowing for a build-a-panel environment that allows for quicker delivery times and rapid service turn-up in the field.

Figure 17:
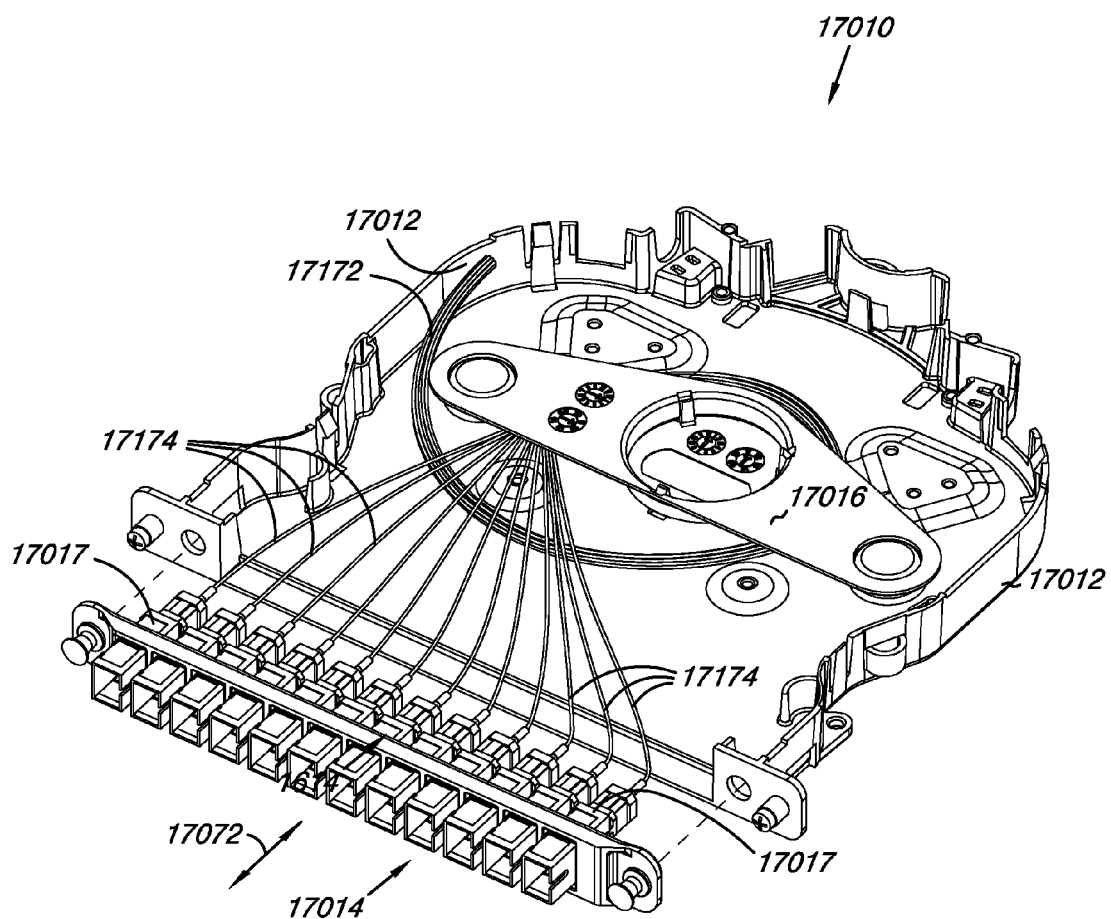
FIG. 17 is a front perspective view of a modular optic fiber cassette housing having an adapter plate extended away from the optic fiber cassette housing in accordance with one or more embodiments of the present disclosure.

FIG. 17 is a front perspective view of a modular optic fiber cassette housing having an adapter plate extended away from the optic fiber cassette housing in accordance with one or more embodiments of the present disclosure. Adapter plate 17014, including internal connectors 17017, can be detached from base housing 17102 of cassette 17010, and moved in a direction indicated by arrows 17072 (e.g., away from the base housing 17012). The fibers 17174 attached to the internal connectors 17017 pull fiber loop 17172 tighter around radius limiter 17016, as can be seen in FIG. 17 compared to FIG. 16. Fiber loop 17172 includes enough slack to permit the adapter plate 17014, which is releasable from the base housing 17012, to be pulled far enough away from base housing 17012 to permit access to both sides of the adapter plate 17014, including internal connectors 17017 (e.g., without removing cassette 17010 from a rack (not shown) upon which it may be secured by its flange). Providing access to both sides of the adapter plate 17014, including to external connectors 1015 shown in FIG. 1 and internal connectors 17017, while cassette 17010 is secured into a rack is beneficial for ease of installation, maintenance, and cleaning. This ease of access also reduces the risk of fiber damage to adjacent cassettes in a fiber management housing (e.g., rack mount). The releasable adapter plate 17014 minimizes movement of individual fibers that may occur in previous approaches.

FIG. 18 is a front perspective view of a modular optic fiber cassette housing having a pre-loaded splice tray nested in the optic fiber cassette housing in accordance with one or more embodiments of the present disclosure. FIG. 18 illustrates a configuration that can be used for a patch and splice applications where cassette 18010 further includes a splice tray 18018 nested within base housing 18012. FIG. 18 illustrates how fiber can be routed from the base housing 18012 to the splice tray 18018, since the fiber loop 17172 shown in FIG. 17 in the base housing continues on to become fiber loop 18172 in the splice tray, as illustrated in FIG. 18.

Patch and splice applications for cassette 18010 utilizes base housing 18012, radius limiter (not visible in FIG. 18 since nested below splice tray), splice tray 18018, and housing cover (e.g., 1022 in FIG. 1—not shown in FIG. 18 so that internal components of cassette 18010 are visible). The splice tray 18018 nests atop of, and rests upon, the radius limiter (e.g., 17016 shown in FIG. 17, if installed, which in turn is supported by its central hub (e.g., 9072 shown in FIG. 9) and bosses (e.g., 8098 and 8100 shown in FIG. 8) extending from the floor 8056 of the base housing 8012, as shown in FIG. 8. Bosses (e.g., 8098 and 8100) extend through the radius limiter (e.g., 17016) via corresponding holes (e.g., 9102 and 9106) therethrough, such that the splice tray can rest upon, and be supported by, the bosses. For cassette configurations not utilizing the radius limiter (e.g., 17016), the splice tray 18018 can still rest upon, and be supported by, the bosses (e.g., 8098 and 8100 shown in FIG. 8).

A front portion of the splice tray 18018 can also rest upon, and be supported by, one or more stand-offs 18061. Stand-offs 18061 are shown being located under the front corners of the splice tray 18018 for maximum side-to-side and front-to-back stability. In working with the fiber splices, located near the front portion of the splice tray (e.g., nearest the adapter plate), technicians can exert vertical force down on the front portion of the splice tray in attempting to seat splices and buffer tubes into the splice tray. Thus, having adequate support under the front of the splice tray is advantageous in protecting individual fibers that run beneath the splice tray to the connectors of the adapter plate.

While two bosses, and two stand-offs are illustrated in the present disclosure, embodiments of the present invention are not restricted to these respective quantities. The reader will appreciate that three points arranged in space define a plane, and three support locations can provide reasonable mechanical stability of a planar device. According to one or more embodiments, the splice tray is supported in the base housing atop the radius limiter by at least one boss extending from the base housing through the radius limiter, and by at least one stand-off extending from the base housing not through the radius limiter, the at least one boss and at least one stand-off defining a plane upon which the splice tray rests. For example, according to one or more embodiments, a single stand-off may be centrally located to support the front portion of the splice tray, along with the two bosses that support the radius limiter. In some embodiments, stand-offs may be located under other portions of the splice tray.

Cassette 18010 does not restrict space when splicing is required, and eliminates the need for twelve-fiber tight-buffered slack storage that requires additional space outside of traditional fiber management products. Cassette 18010 allows for up to one meter of tight-buffered 900-micron assemblies pre-terminated and pre-loaded and slack-stored inside of cassette 18010. OSP fiber cable can be brought directly to one or more cassettes 18010 for splicing. Slack storage space for buffer-tube-only applications minimizes space needed for storage and eliminates congestion, and cable lock-in as tight buffered cables are not stored in the same routing space.

Space allocation can be done in advance of arrival of splicing technicians. Cassette 18010 can be handled the same was as a traditional splice tray is handled but with added benefit of a terminated assembly already attached. Cassette 18010 also supports traditional off-frame splicing and on-frame splicing applications, using separate splice decks.

For patch and splice configurations (illustrated), fiber loop (e.g., 16172 shown in FIG. 16) is tight buffered and is routed from the lower level of cassette 18010 to the second level of the cassette 18010 (e.g., the splice tray 18018) via splice tray ramp 18128, with additional fiber slack stored within fiber nest 18134. The opposite ends of fibers (e.g., 16174 shown terminated to internal connectors 16017 in FIG. 16) can be positioned for splicing in splice channels 18154 (e.g., two per each channel 18154). Up to one half meter of slack storage is available from the upper and lower levels of the illustrated cassette 18010, including in the base housing 18012 and splice tray 18018. However, embodiments of the present disclosure are not limited to this amount of slack storage, and cassettes may be configured to provide more, or less, slack storage capability (e.g., volume).

Figure 19:
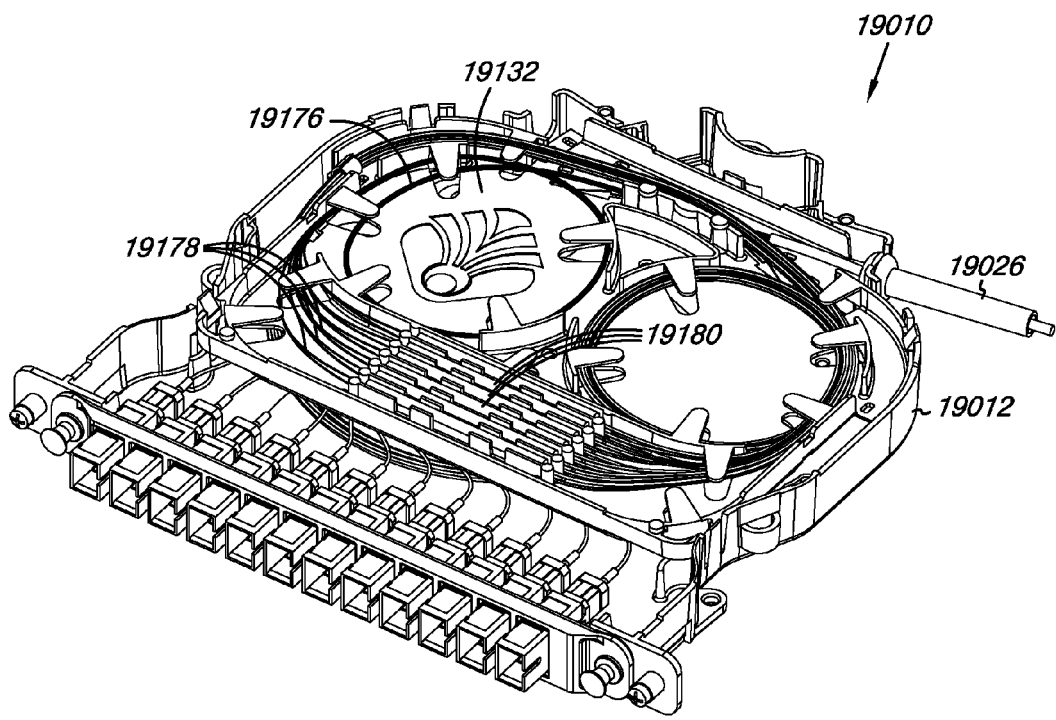
FIG. 19 is a front perspective view of a modular optic fiber cassette housing having a splice tray nested in the optic fiber cassette housing in accordance with one or more embodiments of the present disclosure.

FIG. 19 is a front perspective view of a modular optic fiber cassette housing having a splice tray-nested in the optic fiber cassette base housing 19012 in accordance with one or more embodiments of the present disclosure. In the field, a buffer tube 19176 is routed into the cassette 19010 through strain relief tube 19026, which provides bend radius protection. Fiber optic cables can be secured in place, for example, by fastening them to lacing points using zip ties or lacing cord. The buffer tube 19176 can be routed such that slack is stored in fiber nest 19132, and broken out into individual fibers 19178, which in turn are spliced with fibers (e.g., 18154 shown in FIG. 18) to form splices 19180 that are positioned in splice channels (e.g., 18154) of the splice tray (e.g., 18018 shown in FIG. 18).

In one or more patch and splice applications, cassette 19010 can be pre-loaded with a 12-fiber assembly of 900 micron individual fiber circuits terminated to twelve connectors that are mated to connectors (e.g., 17017) on adapter plate (e.g., 17014). A user would then bring an OSP (outside the plant) or IFC (intra-facility cable) cable that is either a buffer tube (OSP) or subunit (IFC) of 12-fibers that has been broke from an overall jacket housing a number of subunits (e.g., buffer tubes). For example, a 144 fiber cable has 12 subunits (distribution) or buffer tubes (OSP) inside an overall jacket. A 96 fiber cable has eight subunits or buffer tubes of 12 fibers each, etc. The particular fiber cable is spliced to pre-terminated (e.g., pre-loaded) fiber assemblies inside a cassette (e.g., 18010) via splice tray 18018. The fibers can be broken out by buffer tubes therein, with each buffer tube being terminated to one of a number of cassettes needed to equal the total fiber count of the cable divided by twelve. For example, a 144 fiber cable can be terminated into twelve pre-loaded cassettes.

Referring back to FIG. 1, adapter plates (e.g., 1014) support industry standard connectors on interconnect field. The feeder field supports a variety of cable constructions in addition to multi-fiber ribbon connector MPT/MPO. The feeder field is the fiber optics coming from a central office or where content is being generated and then sent downstream to a patch panel or cabinet in the field. The distribution field or network points downstream to the end user or subscriber such as a home or business. The interconnect functions occur when the feeder network is physically connected or mated to the distribution network (e.g., through cassettes 1010). For example, a cassette 1010 that has been terminated with a cable that is coming from a central office would have a patch cord mated to one of connectors 1015 of which the other end is mated to another connector 1015 on a different cassette 1010 that has been terminated with a cable that is pointing downstream to the end user.

For patch only configurations cassette 1010 can be pre-loaded with distribution or OSP tight-buffered constructions including ribbon and breakout style cables. Multi-fiber counts above twelve can be supported with multi-cassette configurations. Cassette 1010 supports plural entry-exit points and cable tie-offs including integrated grommet strain-relief for delicate constructions.

FIG. 20 is a front perspective view of a modular optic fiber cassette housing having a modular optical component nested in the optic fiber cassette housing in accordance with one or more embodiments of the present disclosure.

Base housing 20012 can include a number of mounting regions (e.g., 20066, 20068), as previously discussed with respect to FIG. 8, which can be used to mount the modular optical component 20067 inside the base housing 20012. Depending on the function and configuration of the modular optical component 20067, connections may be routed to the connectors of the adapter plate 20014, among other locations.

Base housing 20012 can accept optical components such as FBT (fused biconic taper) and planar lightwave circuit (PLC) splitters in either tube style, and cassette packaging, among others. Additionally, wave division multiplexers for both coarse and densewave applications can be integrated. Single height cassettes support optical components comprising twelve combined input/output interfaces. Double and triple height cassettes (e.g., having expansion housings—discussed below) support any configuration or applications that exceeds twelve combined input/output interfaces.

As illustrated in FIG. 20, various optical components (e.g., wave splitters, signal branches, couplers, WDM's, CWDM's, DWDM's, among others) can be operatively positioned within base housing 20012. A modular optical fiber cassette, including base housing 20012, can advantageously function as a fiber management device and an optical component chassis or hybrid chassis that supports both a predetermined number of terminated ports and optical component hardware. Higher port counts of splitters such as 1×16, 1×32, and 1×64 split counts are advantageously supported in 2, 3, and 6 high cassettes 10.

Any combination of mounting regions (e.g., 6062, 6064, 6066, and 6068 as shown in FIG. 6) can be used to mount an optical component. In some embodiments, a bracket (not shown) can be attached to one or more of mounting regions having multiple bosses (e.g., 6062 and 6064 as shown in FIG. 6). The bracket can be used to secure the optical component. In one or more embodiments, an optical component can be directly attached to the mounting regions using one or more fasteners into the multiple bosses (e.g., 6062 and 6064 as shown in FIG. 6). In other embodiments, all mounting regions (e.g., 6062, 6064, 6066, and 6068 as shown in FIG. 6) are used to secure large optical components (e.g., optical components having a large number of input/output legs, such as those packaged in a 10 mm×80 mm×100 mm package).

Figure 21:
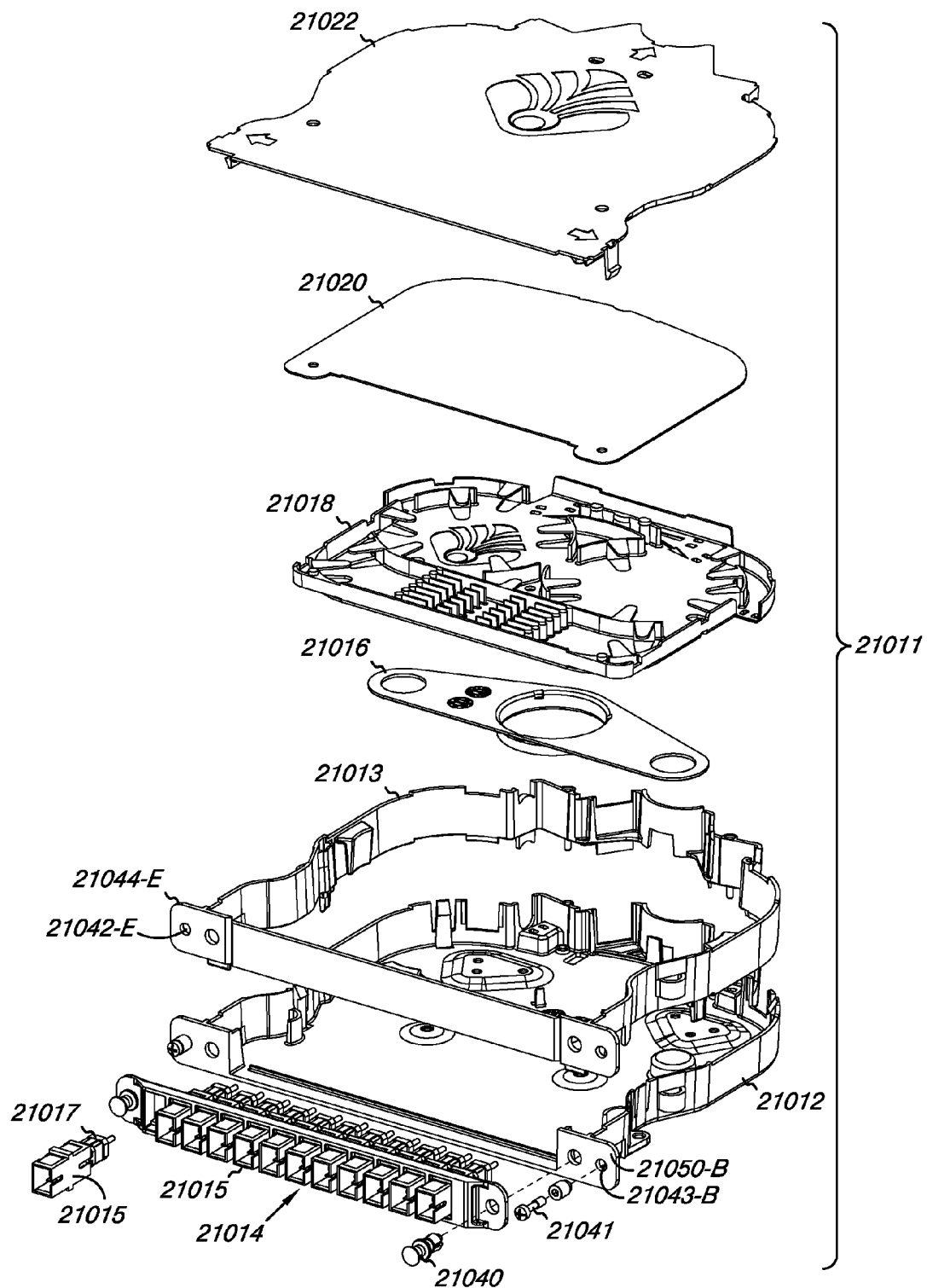
FIG. 21 is an exploded perspective view of a modular optic fiber cassette including a housing base and expansion housing in accordance with one or more embodiments of the present disclosure.

FIG. 21 is an exploded perspective view of a modular optic fiber cassette including a housing base and housing extender in accordance with one or more embodiments of the present disclosure. The cassette 21011 illustrated in FIG. 21 is similar to the cassette 1010 shown in FIG. 1, with the addition of an expansion housing 21013. Modular optical fiber cassette 21011 (hereinafter "cassette"), as shown, comprises a base housing 21012, adapter plate 21014 (including a plurality of external connectors 21015 and internal connectors 21017), expansion housing 21013, radius limiter 21016, splice tray 21018, splice tray cover 21020, and housing cover 21022. Adapter plate can be attached to base housing 21012 by one or more quick-release fasteners 21040, and base housing 21012 can be attached and/or mounted to a rack (not shown) by fasteners 21041 (e.g., screws) through opening 21043-B in tab 21050-B ("B" indicates "base," similar features on expansion housing are indicated by similar reference numbering followed by "E" indicating "expansion"). Similarly, expansion housing 21013 can be attached and/or mounted to the rack (not shown) by similar fasteners through opening 21042-E in tab 21044-E.

While cassette 21011 is shown in FIG. 21 as including all of the above-mentioned components, embodiments of the present disclosure are not so limited, and a particular cassette 21011 may be assembled to include additional components not shown in FIG. 21, or less than all the components illustrated in FIG. 21, depending on a particular application for cassette 21011.

Figure 22:
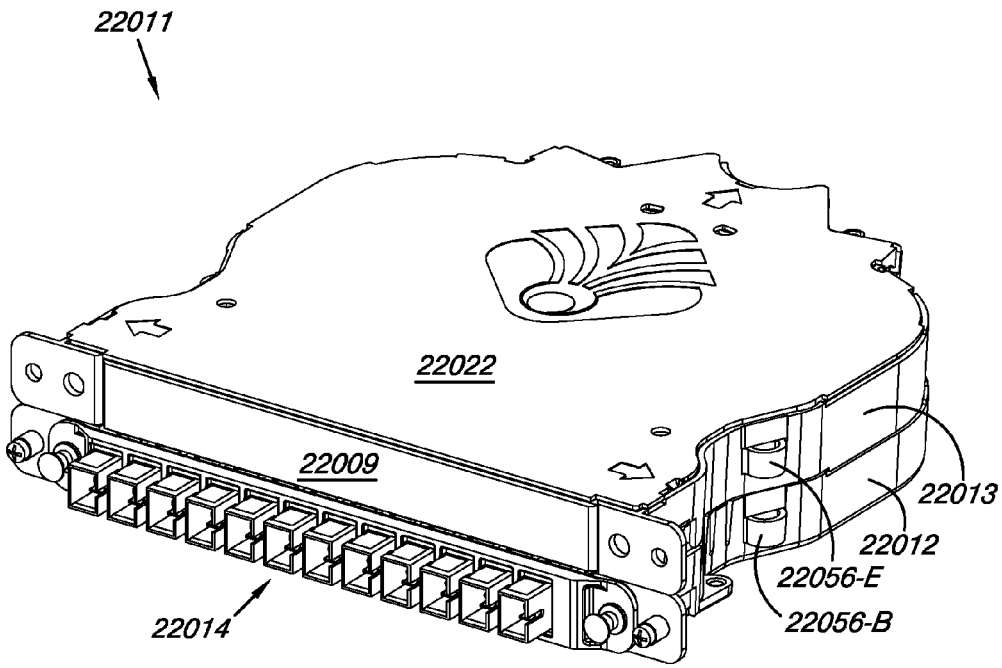
FIG. 22 is a top front perspective view of a modular optic fiber cassette including a housing base and expansion housing in accordance with one or more embodiments of the present disclosure.
Figure 23:
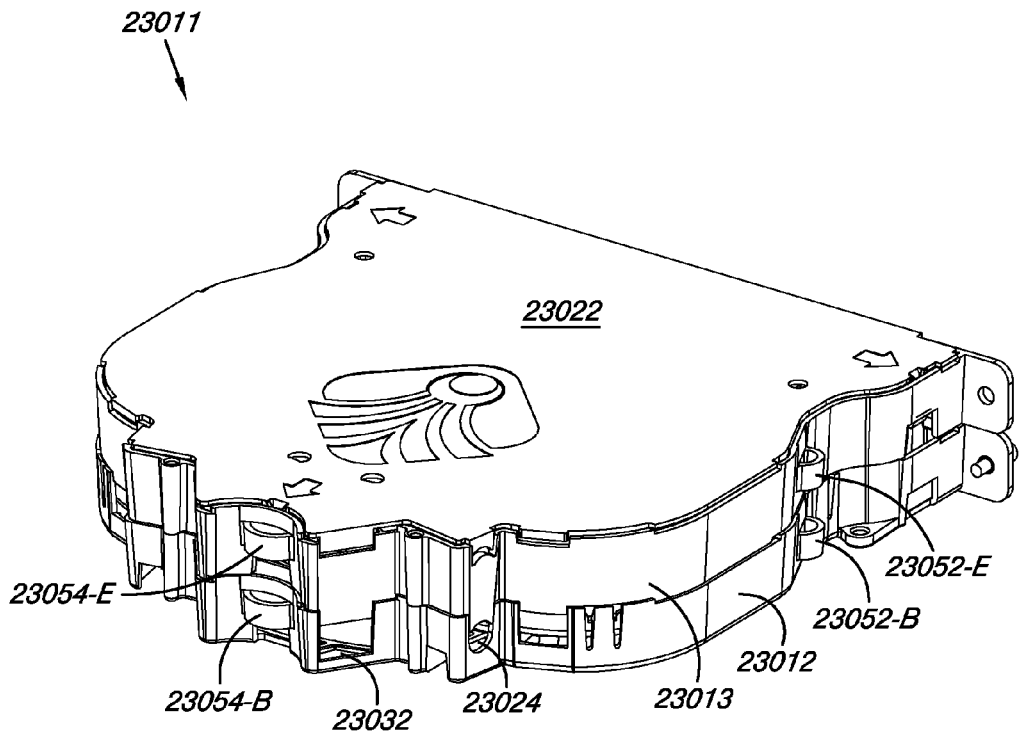
FIG. 23 is a top rear perspective view of a modular optic fiber cassette of including a housing base and housing extender in accordance with one or more embodiments of the present disclosure.

FIG. 22 is a top front perspective view of a modular optic fiber cassette 22011 including a housing base 22012, an expansion housing 22013, and a cover 22022 in accordance with one or more embodiments of the present disclosure, and FIG. 23 is a top rear perspective view of a modular optic fiber cassette 23011 of including a housing base 23012 and expansion housing 23013 in accordance with one or more embodiments of the present disclosure. Expansion housing 23013 includes a faceplate 22009 above the opening in base housing 22012 located to receive the adapter plate 22014. When a cassette 22011 includes an expansion housing 22013, the cover 22011 is attached to the expansion housing 22013 rather than the housing base 23012.

A cassette (e.g., 22011 in FIG. 22 and/or 23011 in FIG. 23) can include a number of anchor points (e.g., right side anchor point 22056-B on base housing 22012 shown in FIG. 22, right side anchor point 22056-E in expansion housing 22013 shown in FIG. 22, left side anchor point 23052-B on base housing 23012 shown in FIG. 23, left side anchor point 23052-E in expansion housing 22013 shown in FIG. 23, rear anchor point 23054-13 on base housing 23012 shown in FIG. 23, and rear anchor point 23054-E in expansion housing 23013 shown in FIG. 23).

The anchor points can be used to gang (e.g., group) cassettes (including base housing and expansion housings) together into one block for easier installation and shipping. As the cassettes are modular, each having a capacity to handle units of 12 fibers, the quantity of cassettes may be selected to accommodate a presently used fiber count, and subsequently modified to accommodate a different future fiber count. For example, a 288-port cabinet may be initially loaded with 144 ports (e.g., less than the full capacity of the cabinet) using 12 cassettes, each cassette terminating 12 fibers. If in the future there is a need for additional fiber capacity in the cabinet, a number of pre-terminated cassettes (e.g., 12 cassettes, each terminating 12 fibers, for a total of an additional 144 fibers) can be added to the cabinet. The 12 new cassettes can be ganged (e.g., fastened together) into a solid block for easier installation and handling.

Cassettes may configured to be single height (e.g., comprising just a base housing and no expansion housing), or configured to be an expanded height by utilizing one or more expansion housings (e.g., 23013). While FIGS. 22 and 23 illustrate cassettes 22011 and 23011 as including a single expansion housing (e.g., 22013 and 23013 respectively), embodiments of the present disclosure are not so limited, and may include one or more expansion housings. Furthermore, some anchor points (described above) may be used to join all cassettes of a group together into a block, or join all expansion housings of a particular cassette to its base housing, or some combination thereof.

FIG. 23 illustrates that base housing retains an opening 23024 for a strain relief tube (e.g., 5028 shown in FIG. 5), similar to opening 3024 shown in FIG. 3, however, the top portion of the opening is completed by the expansion housing 23013, rather than the by cover 23022. Base housing also retains an opening 23032 for a connector (e.g., 4036 shown in FIG. 4), similar to opening 3032 shown in FIG. 3, however, the top portion of the opening is completed by the expansion housing 23013, rather than the by cover 23022.

Figure 24:
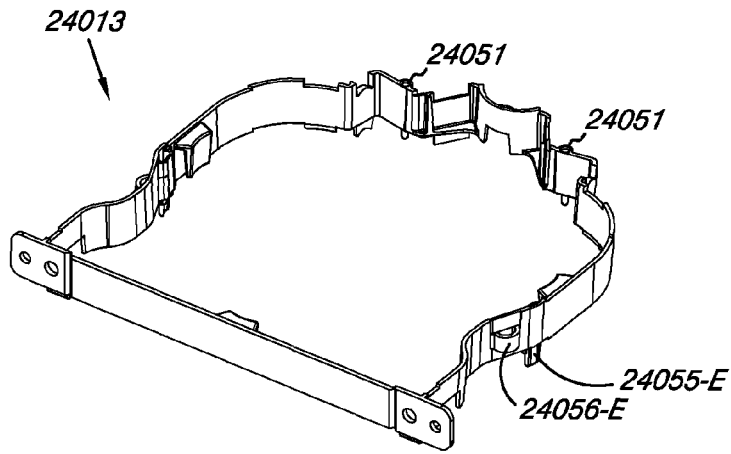
FIG. 24 is a top front perspective view of a modular optic fiber cassette expansion housing in accordance with one or more embodiments of the present disclosure.
Figure 25:
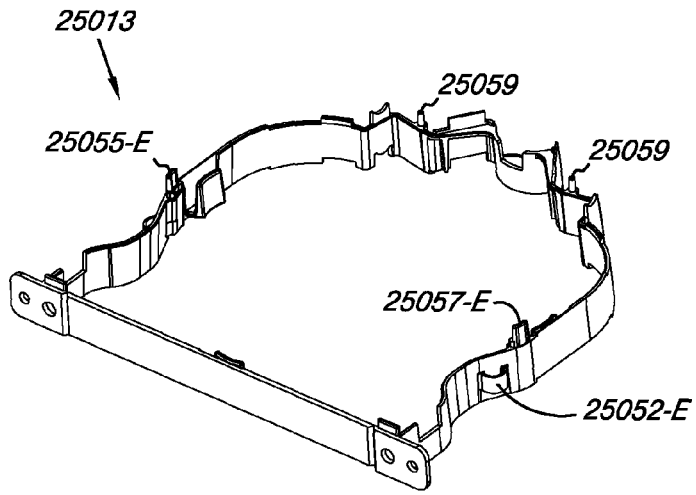
FIG. 25 is a bottom front perspective view of a modular optic fiber cassette expansion housing in accordance with one or more embodiments of the present disclosure.
Figure 26:
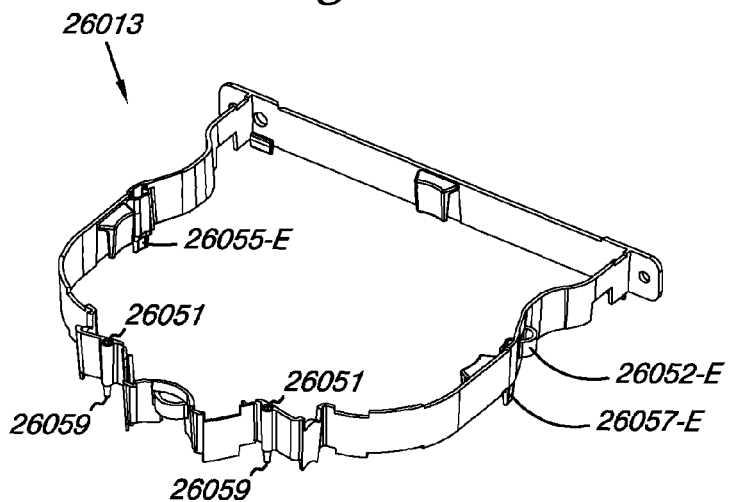
FIG. 26 is a top rear perspective view of a modular optic fiber cassette expansion housing in accordance with one or more embodiments of the present disclosure.

FIG. 24 is a top front perspective view of a modular optic fiber cassette expansion housing 24013 in accordance with one or more embodiments of the present disclosure, FIG. 25 is a bottom front perspective view of a modular optic fiber cassette expansion housing 25013 in accordance with one or more embodiments of the present disclosure, and FIG. 26 is a top rear perspective view of a modular optic fiber cassette expansion housing in accordance with one or more embodiments of the present disclosure. The reader will appreciate that one or more expansion housing may be used to increase the height of a particular cassette, thereby creating more volume inside and allowing additional fiber storage or additional component modules, or component modules of increased height, etc.

Expansion housings (e.g., 24013, 25013, 26013) comprise a cassette shell wall, but having two opposing sides (e.g., top and bottom) being open, so as to provide additional cassette volume to the base housing (e.g., 21012 shown in FIG. 21) corresponding to the base housing footprint. For reference, anchor points (e.g., right anchor point 24056-E shown in FIG. 24, left anchor point 25052-E and right anchor point 25055-E shown in FIG. 25, and left anchor point 26052-E shown in FIG. 26 are shown on the expansion housings (e.g., 24013, 25013, and 26013). The expansion housing can include tabs (e.g., 24055-E, 25055-E, 25057-E, 26055-E, and 26057-E) for mating with a base housing (e.g., 23012 in FIG. 23) or another expansion housing when more than one expansion housing is used for a particular cassette. The expansion housing can also include guide pins (e.g., 25059 and 26059) and corresponding guide pin receptacles (e.g., 24051 and 26051) to provide support and alignment with expansion housings.

Figure 27:
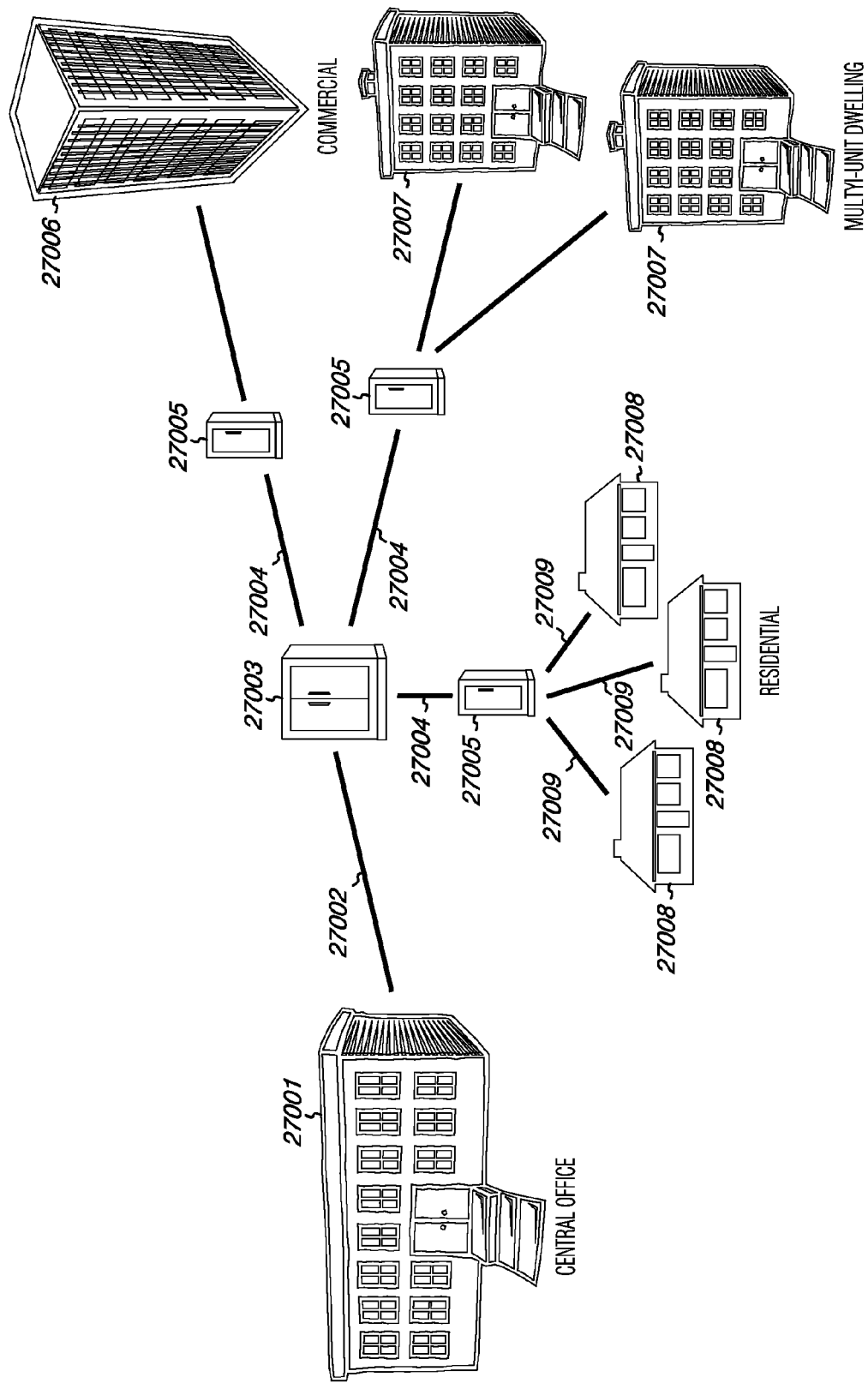
FIG. 27 is a optic fiber communication system in accordance with one or more embodiments of the present disclosure.

FIG. 27 is a optic fiber communication system in accordance with one or more embodiments of the present disclosure. FIG. 27 illustrates an OSP fiber optic feeder 27002 from a central office 27001 to distribution structure 27003. A fiber entrance cabinet (FEC) may be located at the central office 27001 (e.g., head end) typically in an off-frame splicing environment. From the distribution structure 27003, OSP distribution fiber cable 27004 are routed to drop structures 27005, such as a fiber distribution pedestal, which can serve as a final interconnection point in a fiber to the home (FTTH) network before reaching a particular fiber's end user location (e.g., a home). Fiber downstream of the fiber distribution pedestal to the end user location is commonly referred to as "the last mile" regardless of actual distance involved. One or more individual drop fibers 27009 are routed from the drop structure 27005 to end users, such as residential 27008, commercial 27006, and/or multi-unit dwelling 27007 users.

Building a FTTH network is a labor-intensive effort. A significant portion of this labor is associated with the hours it takes a splice crew to perform the tedious work of splicing each individual in-ground/distribution cable to the passive optical network (PON) cabinet. Critical to the control of operational and capital cost controls is a standard splicing methodology that guarantees a timely, quality burn. The splicing of feeder and distribution network fibers to a FTTH-PON cabinet is traditionally done in a splice closure. The enclosure is installed below grade in a handhole directly beneath the cabinet or in a splice vault near the cabinet. The cabinet is preloaded with a factory terminated OSP stub and enough slack, stored in the handhole or splice vault, to allow for the splicing crew to pull both the cabinet stubs and the in-ground feeder/distribution cables out to a desired area. For comfort, convenience and cleanliness, the best place to perform this tedious work is within a controlled environment like a splice trailer. To allow for this convenience, it is not unusual for stubbed lengths to reach 500 feet.

In an effort to reduce costs (and because in some harsh environmental locations the use of a below grade handlhole or splice vault was not possible), some outside plant planners instituted network designs that eliminated the use of the handhole (or splice vault) and incorporated the splicing directly inside of the cabinet. A patch and splice cabinet typically incorporates hardware within the cabinet to perform cable preparation, cable slack storage and splicing. However, this approach presents trade-offs. The user, because pre-terminated slack storage within the cabinet is limited, is forced to perform splicing activities within close proximity of the cabinet. Often, this distance is 15 feet or less. This is usually not enough distance to use the desired controlled environment splice trailer.

The result is that splicing was being done in open-air environments, not conducive to a quality splice. As an alternative, in an effort to get splicing crews out of an open air environment, other network planners ordered the stubbed lengths of jacketed tight buffered cable at the traditionally longer lengths which created additional undesirable conditions: 1) Longer lengths of distribution style tight buffered cables not necessarily designed for OSP environments and, 2) Larger cabinet sizes to accommodate and safely store slack which limited density of the cabinet and footprint it could satisfy.

In PON environments the present disclosure allows network engineers to enjoy the cost savings of patch and splice without the historical trade-offs. Fiber management cassettes and methods in accordance with the present disclosure each provide a complete, cost effective, and turnkey fiber management solution. Advantageously, fiber is protected in sub-units of 12 fibers. Jacketed cable storage is thus eliminated because the 900 micron tight buffers have shed the outer riser-rated jacket in favor of the cassette that protects it not only from human accidental damage but also provides bend radius protection. By eliminating the requirement for jacketed fiber, fiber management cassettes and methods in accordance with the present disclosure accommodate fiber management needs plus the slack storage required for a 288 home served configuration in just 4 cubic feet of cabinet space. Further, due to the nesting and modular design of the fiber management cassettes of the present disclosure, splice trays are integrated into the protection of the cassette itself, eliminating the need for space-consuming (and expensive) splice closures. The splicing solution is thus portable. The user can now pull feeder/distribution cables through the cabinet and as far as OSP slack allows to the splice trailer. Advantageously, the user does not have to manage, at the same time, an OSP tail (from the cabinet) of equal length. The number of splice trays are matched to the cable counts and advantageously nested within fiber management cassettes of the present disclosure.

Advantageously, a user can splice pre-terminated fiber management cassettes to the network fiber inside a controlled environment. To accommodate high-density environments and/or high fiber counts, fiber management cassettes can be ganged or grouped together allowing the splicer to move from 12 to 288 fibers at a time. This allows the user to splice one sheath at a time matching the OSP fiber count to a ganged cassette block without having to manage capacity and entry/exit ports associated with a splice closure.

A ganged block of fiber management cassettes in accordance with the present disclosure eliminates further costs in the splice closure that would have traditionally been used in a patch only environment. The costs of a splice closure loaded with splice trays, slack baskets, and the risk of an un-sealed closure in time can be eliminated. Furthermore, the cumbersome tasks in network design to match cable sheaths and fiber counts inside the closure and the hassle of splitting buffer tubes can be eliminated because the user's cable sheaths will always match the block of fiber management cassettes.

Fiber management cassettes and methods in accordance with the present disclosure can provide cost savings that are gained without having to sacrifice the ease and convenience of a patch only installation. What the user ends up with is an ultra modular fiber management system wherein feeder/distribution ratios are scalable at a user-defined 12 fibers at a time. Fiber management cassettes in accordance with the present disclosure provide a patch and splice system that can be used like traditional patch only but has eliminated costs associated with jacketed fiber, the space that was traditionally allocated to store the terminated slack, the cost of a splice case sitting below the cabinet in the handhole, and the size of the handhole necessary because no splice vault is used.

Any optical circuit that is being touched or that is moving is potentially at risk of damage: Thus, solutions that minimize touching and/or moving such circuits are preferred. Fiber management cassettes and methods in accordance with the present disclosure advantageously reduce the number of touches, re-routes, and the amount of moving fiber. Two areas of fiber management of particular interest are the splitter parking lot and swinging bulkheads.

Fiber management cassettes and methods in accordance with the present disclosure minimize risk of damage to the splitter module as cassettes can be pre-parked within a disposable, parking block, enabling the user to simply place the splitter into the splitter cage, route the pre-parked jumpers up to the parking block storage area and deploy subscriber circuits from there. This deployment methodology enables the majority of the final destination of each output leg to be touched only once. As subscribers are turned up, each leg is routed to the required port without having to remove a jumper from a bundle of live circuits.

Swinging bulkheads can provide ease of access, but swinging bulkheads have drawbacks. In certain swinging bulkheads it is possible to have 288, 576, or 576 delicate 900-micron fibers moving all at once. According to one or more embodiments of the present disclosure, fiber management is designed to minimize the risk on both sides of the adapter from the feeder to the distribution network. This is true whether a splitter output circuit is parked or in-service. This is especially true for multifiber OSP cables whose buffer tubes have been exposed and removed from the very material designed to protect it and allowed to move with every bulkhead opening.

CONCLUSION

The present disclosure includes apparatus and methods for a modular optical fiber cassette. One embodiment includes a base housing configured to receive additional nested components and an adapter plate resiliently connected to the housing and comprising a plurality of optical fiber connectors. The adapter plate is releasable from the housing and providing access to both sides of the adapter plate. The cassette further includes a radius limiter nested with and resiliently connected to the base housing, a first expansion housing having an exterior contour substantially aligned with the base housing and configured to resiliently interlock with the base housing, and a cover resiliently connected to the expansion housing.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A modular optical fiber cassette comprising:
    a base housing configured to receive additional nested components;
    an adapter plate resiliently connected by a number of fasteners to a number of flanges of the housing and comprising a plurality of optical fiber connectors, the adapter plate being releasable from the housing and providing access to both sides of the adapter plate;
    a radius limiter nested with and resiliently connected to the base housing;
    a splice tray nested with and resiliently connected to the base housing, the splice tray comprising a plurality of splice channels and at least one fiber nest that provides storage of coiled optical fiber, wherein the splice tray is supported in the base housing atop the radius limiter by at least one boss extending from the base housing through the radius limiter, and by at least one stand-off extending from the base housing not through the radius limiter, the at least one boss and at least one stand-off defining a plane upon which the splice tray rests;
    a first expansion housing having an exterior contour substantially aligned with the base housing and configured to resiliently interlock with the base housing; and
    a cover resiliently connected to the first expansion housing.

2. The cassette of claim 1, further including a splice tray cover resiliently connected to the splice tray.

3. The cassette of claim 1, wherein the splice tray includes at least one splice channel having a first configuration for containing splicing tubes, and at least one splice channel having a second configuration for containing ribbon splicing sleeves.

4. The cassette of claim 1, further including a second expansion housing having an exterior contour substantially aligned with the first expansion housing and configured to resiliently interlock with the first expansion housing.

5. The cassette of claim 1, wherein the splice tray includes lacing points located near respective raceway entry/exit openings, the lacing points configured for securing fibers routed between the base housing and the splice tray.

6. The cassette of claim 1, wherein the base housing and the first expansion housing have anchor points located exterior to each of the base housing and the first expansion housing configured to accept a cable tie therethrough in fastening the base housing and expansion housing together, the anchor points being located to provide sufficient space between vertically-aligned anchor points to accommodate a closure portion of the cable tie in the space, such that the closure portion of the cable tie is substantially vertically aligned with the anchor points.

7. A plurality of modular optical fiber cassettes, each cassette comprising:
   a base housing configured to receive additional nested components;
   an adapter plate resiliently connected to the housing and comprising a plurality of optical fiber connectors, the adapter plate being releasable from the housing and providing access to both sides of the adapter plate; and
   a radius limiter nested with and resiliently connected to the base housing,
   wherein the plurality of modular optical fiber management cassettes are fastened together into a group using cable ties through anchor points located exterior to each of the base housings.

8. The plurality of cassettes of claim 7, wherein at least one cassette is configured to include a first expansion housing having an exterior contour substantially aligned with the base housing and configured to resiliently interlock with the base housing.

9. The plurality of cassettes of claim 8, wherein at least one cassette is configured to only include a base housing and not include a first expansion housing.

10. The plurality of cassettes of claim 8, wherein at least one cassette is configured to include a second expansion housing having an exterior contour substantially aligned with a first expansion housing and configured to resiliently interlock with the first expansion housing.

11. The plurality of cassettes of claim 8, wherein at least one cassette, but less than all cassettes, are configured to include a splice tray nested with and resiliently connected to the base housing, the splice tray comprising a plurality of splice channels and at least one fiber nest that provides storage of coiled optical fiber.

12. The plurality of cassettes of claim 11, wherein at least one splice tray includes a splice tray cover resiliently connected to the splice tray.

13. The plurality of cassettes of claim 8, wherein at least one cassette is configured to include a cover resiliently connected to the first expansion housing.

14. The plurality of cassettes of claim 8, wherein at least one cassette is configured to include an optical splitter component.

15. The plurality of cassettes of claim 8, wherein the plurality of cassettes are rack mounted in a building upstream from a fiber feeder cable.

16. The plurality of cassettes of claim 8, wherein the plurality of cassettes are mounted in a fiber entrance cabinet downstream from a fiber feeder cable.

17. The plurality of cassettes of claim 8, wherein the plurality of cassettes are mounted in a outside drop structure, downstream from a fiber drop cable.

18. An optical fiber management system, comprising:
   a first modular optical fiber cassette configured for patch only, including:
      a first base housing configured to receive additional nested components;
      a first adapter plate resiliently connected to the first base housing and comprising a first plurality of optical fiber connectors, the first adapter plate being releasable from the first base housing and providing access to both sides of the first adapter plate;
      a first radius limiter nested with and resiliently connected to the first base housing;
      a first expansion housing having an exterior contour substantially aligned with the first base housing and configured to resiliently interlock with the first base housing; and
      a first cover resiliently connected to the first expansion housing; and
   a second modular optical fiber cassette coupled to the first modular optical fiber cassette and configured for patch and splice, including:
      a second base housing configured to receive additional nested components;
      an second adapter plate resiliently connected to the second base housing and comprising a second plurality of optical fiber connectors, the second adapter plate being releasable from the second base housing and providing access to both sides of the second adapter plate;
      a second radius limiter nested with and resiliently connected to the second base housing;
      a splice tray nested with and resiliently connected to the second base housing, the splice tray comprising a plurality of splice channels and at least one fiber nest that provides storage of optical fiber;
      a second expansion housing having an exterior contour substantially aligned with the second base housing and configured to resiliently interlock with the second base housing; and
      a second cover resiliently connected to the second expansion housing.

* * * * *